(12) United States Patent
Hayashi et al.

(10) Patent No.: US 7,025,908 B1
(45) Date of Patent: Apr. 11, 2006

(54) OPTICAL FILTER AND PROCESS FOR PRODUCING THE SAME

(75) Inventors: Naoki Hayashi, Iwaki (JP); Hiroki Katono, Iwaki (JP); Masuhiro Syouji, Iwaki (JP); Tomoyoshi Koizumi, Iwaki (JP); Katsuichi Machida, Iwaki (JP)

(73) Assignee: Kureha Corporation, Tokyo (JP)

( * ) Notice: Subject to any disclaimer, the term of this patent is extended or adjusted under 35 U.S.C. 154(b) by 719 days.

(21) Appl. No.: 10/088,281

(22) PCT Filed: Sep. 6, 2000

(86) PCT No.: PCT/JP00/06058

§ 371 (c)(1),
(2), (4) Date: Mar. 13, 2002

(87) PCT Pub. No.: WO01/20374

PCT Pub. Date: Mar. 22, 2001

(30) Foreign Application Priority Data

Sep. 16, 1999 (JP) ............................. P11-262291
Jun. 13, 2000 (JP) .......................... P2000-177107

(51) Int. Cl.
*H01L 27/102* (2006.01)

(52) U.S. Cl. .................. 252/582; 523/136; 524/145; 524/781

(58) Field of Classification Search ............... 524/145, 524/781; 252/582; 523/136
See application file for complete search history.

(56) References Cited

U.S. PATENT DOCUMENTS 5,567,778 A 10/1996 Sakagami et al.
5,611,965 A * 3/1997 Shouji et al. ............... 252/582
6,410,613 B1 * 6/2002 Ohnishi et al. ............. 523/136

FOREIGN PATENT DOCUMENTS

| EP | 0 586 135 A2 | 3/1994 |
|----|--------------|--------|
| EP | 1 008 599 A1 | 6/2000 |
| JP | 06-118228 | 4/1994 |
| JP | 09-211220 | 8/1997 |
| JP | 10/242441 | 9/1998 |
| JP | 10-282335 | * 10/1998 |
| JP | WO 99/10354 | 3/1999 |
| JP | 11-315215 | 11/1999 |

* cited by examiner

*Primary Examiner*—Bernard Lipman
(74) *Attorney, Agent, or Firm*—Beyer Weaver & Thomas LLP

(57) ABSTRACT

The optical filter of the present invention is provided with a near infrared light absorption layer that contains a component composed of copper ions and a phosphoric ester compound expressed by the following Formula (10), in which the phosphorus atom content in the near infrared light absorption layer is 0.4 to 1.3 mol per mole of copper ions, and the copper ion content in the near infrared light absorption layer is 2 to 60 wt %. Thus keeping the phosphorus atom and copper ion content within specific ranges results in good near infrared light absorption and in improved moisture resistance whereby devitrification caused by whitening is suppressed

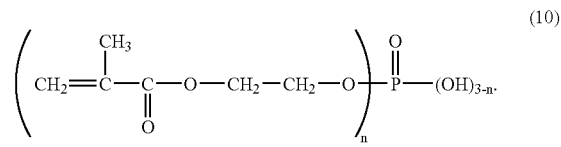

5 Claims, 7 Drawing Sheets

OPTICAL FILTER AND PROCESS FOR PRODUCING THE SAME

TECHNICAL FIELD

This invention relates to an optical filter and a method for manufacturing the same.

BACKGROUND ART

Conventional optical filters having near infrared light absorption characteristics have been disclosed in Japanese Laid-Open Patent Application H6-118228 and elsewhere, in which the optical filter contains a phosphoric ester compound and an ionic metal component whose main component is copper ions.

A characteristic of this optical filter is that it efficiently absorbs near infrared light, but has high transmissivity to visible light, and is therefore used in applications that require the transmission of visible light and the blocking of near infrared light, such as thermal absorption members for windows, visibility correction filters, and display panels.

DISCLOSURE OF THE INVENTION

In terms of raising the visible light transmissivity of an optical filter, and from the standpoints of ease of handling and less bulkiness, it is useful for the optical filter to be thinner. Copper ions are what provide the near infrared light absorption, and the copper ion content (concentration) must be sufficiently high in order to obtain an optical filter having adequate near infrared light absorption when the thickness thereof has been reduced.

The inventors studied the above-mentioned conventional optical filters, and discovered that the environment resistance of these conventional optical filters tends to deteriorate when the copper ion content is raised.

In specific terms, moisture (water) in the environment has the effect of gradually whitening (clouding) an optical filter over long-term use, until so much transmissivity is lost that visible light can no longer be transmitted (known as devitrification). In particular, this devitrification tends to accelerate in environments or seasons of high temperature and humidity, and this can shorten the service life of an optical filter.

The present invention was conceived in light of this situation, and it is an object thereof to provide an optical filter that has adequate near infrared light absorption while also having outstanding moisture resistance.

The inventors conducted diligent research aimed at achieving the stated object, and arrived at the present invention upon discovering that in the composition of an optical filter containing a phosphoric ester compound and a copper compound, or copper phosphate compound, the ratio in which the phosphorus atoms and copper ions are contained greatly affects the moisture resistance of the optical filter. Specifically, the optical filter of the present invention comprises a near infrared light absorption layer containing the following component A and/or the following component B:

Component A: a component composed of copper ions and a phosphoric ester compound expressed by the following Formula (1), Component B: a copper phosphate compound obtained by reaction of a copper compound with the phosphoric ester compound, wherein the phosphorus atom content in the near infrared light absorption layer is 0.4 to 1.3 mol per mole of copper ions, and the copper ion content in the near infrared light absorption layer is 2 to 60 wt %, and preferably 2 to 20 wt %, with 2 to 15 wt % being particularly favorable.

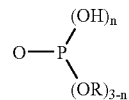

(1)

In Formula (1), R is a group expressed by the following Formula (2), (3), (4), (5), (6), (7), (8), or (9), an alkyl group, an aryl group, an aralkyl group, or an alkenyl group, n is 1 or 2, and when n is 1, the R groups may be the same or different.

(2)

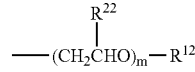

(3)

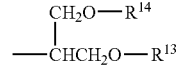

(4)

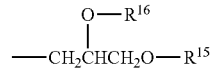

(5)

(6)

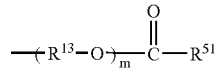

(7)

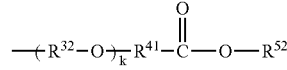

(8)

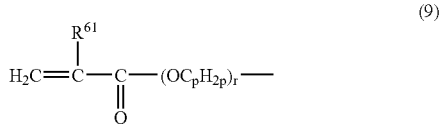
(9)

In Formulas (2) to (9), $R^{11}$ to $R^{17}$ are $C_1$ to $C_{20}$ (number of carbon atoms) alkyl groups or $C_6$ to $C_{20}$ aryl groups or aralkyl groups (where the one or more hydrogen atoms bonded to the carbon atoms that make up aromatic rings may be substituted with $C_1$ to $C_6$ alkyl groups or halogens), $R^{21}$ to $R^{25}$ are hydrogen atoms or $C_1$ to $C_4$ alkyl groups (where $R^{23}$, $R^{24}$, and $R^{25}$ cannot all be hydrogen atoms), $R^{31}$ and $R^{32}$ are $C_1$ to $C_6$ alkylene groups, $R^{41}$ is a $C_1$ to $C_{10}$ alkylene group, $R^{51}$ and $R^{52}$ are $C_1$ to $C_{20}$ alkyl groups, $R^{61}$ is a hydrogen atom or methyl group, m is an integer from 1 to 6, k is an integer from 0 to 5, p is an integer from 2 to 97, and r is an integer from 1 to 4.

In this optical filter, the phosphoric acid groups of the phosphoric ester compound are bonded to the copper ions by coordination bonding and/or ion bonding, these copper ions are dissolved or dispersed in the near infrared light absorption layer in a state in which they are surrounded by the phosphoric ester, and near infrared light is selectively absorbed through electronic transition between the d orbits of these copper ions.

It has been confirmed that from the standpoint of the dispersibility of copper ions in the near infrared light absorption layer, and the moisture resistance of the optical filter, it is extremely favorable for the phosphorus atom content in the near infrared light absorption layer to be 0.4 to 1.3 mol per mole of copper ions, that is, for the ratio in which the phosphorus atoms are contained versus the copper ions (hereinafter referred to as "P/Cu") to be 0.4 to 1.3.

If the P/Cu molar ratio is less than 0.4, there will be an excess of copper ions coordinated with respect to the phosphoric ester compound, and the copper ions will tend not to disperse uniformly in the near infrared light absorption layer. The near infrared light absorption layer may also be formed from a resin composition in which the above-mentioned component A and/or component B is contained in a resin. This will allow the characteristics of the resin to be imparted to the optical filter, and here again, if the molar ratio of P/Cu is less than 0.4, the copper ions will tend not to disperse uniformly in the resin. On the other hand, if the P/Cu molar ratio is over 1.3, devitrification will tend to occur more readily when the thickness of the optical filter is reduced and the copper ion content raised, and this tendency will be particularly pronounced in environments of high humidity and temperature.

It is preferable for the P/Cu molar ratio to be 0.8 to 1.3. The dispersibility of the copper ions in the resin can be reliably and sufficiently raised if this molar ratio is at least 0.8.

Also, if the copper ion content in the near infrared light absorption layer is under the above-mentioned lower limit, it will tend to be difficult to obtain adequate near infrared light absorption when the thickness of the optical filter or near infrared light absorption layer is reduced to about 1 mm. On the other hand, if the copper ion content exceeds the upper limit given above, it will tend to be difficult to disperse the copper ions in the near infrared light absorption layer. The same tendencies are exhibited when, as mentioned above, the near infrared light absorption layer is formed from a resin composition containing the above-mentioned component A and/or component B.

It is preferable for the phosphoric ester compound to be such that $R^{61}$ in Formula (9) is a methyl group, p in Formula (9) is 2 or 3, and r in Formula (9) is 1, or more specifically, for it to be a phosphoric ester compound expressed by the following Formula (10), or a phosphoric ester compound expressed by the following Formula (11).

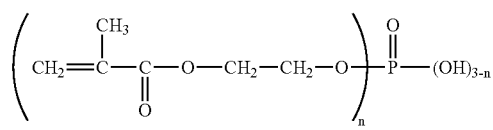
(10)

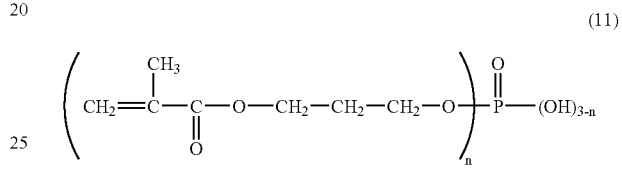
(11)

If the alkylene oxide group in the methacryloyloxyalkyl group expressed by Formula (9) is thus an ethylene oxide group or propylene oxide group, the near infrared light absorption will be higher than with a phosphoric ester compound having an alkylene oxide group in which the above-mentioned p is 4 or greater. It is therefore possible to raise the selective absorption of near infrared light of the optical filter, and to raise its selective transmission of visible light.

If r (the repeat number of these alkylene oxide groups) is 1, there will be substantially no deterioration in the visible light transmissivity of the optical filter overtime. Thus, the improvement in the moisture resistance of the optical filter will be even better. In contrast, with an optical filter in which r is 2 or greater, and especially one in which the number of alkylene oxide groups is an integer over 4, there will be a tendency for moisture resistance, rigidity, heat resistance, and so forth to deteriorate more readily over time.

The method of the present invention for manufacturing an optical filter is a method for manufacturing an optical filter having a near infrared light absorption layer containing the above-mentioned component A and/or component B, and comprises the step of mixing or bringing into contact a phosphoric ester compound expressed by Formula (1), a copper salt, and water.

In other words, this method comprises a step in which water is made to be present when a phosphoric ester compound expressed by Formula (1) is mixed or brought into contact with a copper salt. This step is particularly favorable when the copper salt is copper acetate, copper acetate monohydrate, copper benzoate, or another such copper salt anhydride or hydrate of an organic acid.

This affords better stability of the monomer composition in the preparation of a resin composition by adding component A and/or component B to a resin, for instance. An advantage of this is that it raises the transparency of the polymer (near infrared light absorption layer of the optical filter) obtained by polymerizing the monomer composition.

It is favorable if a phosphoric ester compound expressed by Formula (1), a copper salt, and water are mixed or brought into contact such that the phosphorus atom content in the near infrared light absorption layer is 0.4 to 1.3 mol per mole of copper ions, and the copper ion content in the near infrared light absorption layer is 2 to 60 wt %.

BEST MODES FOR CARRYING OUT THE INVENTION

Figure 1A:
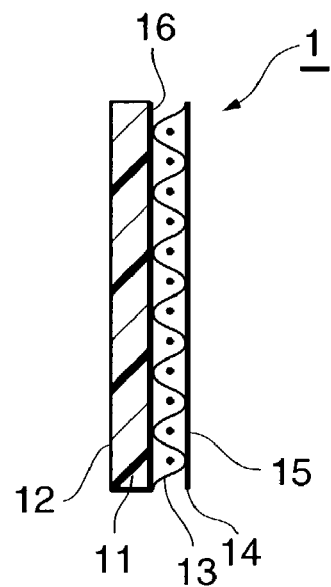
FIG. 1A is a schematic cross section illustrating an example of a display panel in which the optical filter of the present invention is used.

The optical filter of the present invention will now be described in detail.

The optical filter of the present invention comprises a near infrared light absorption layer containing the above-mentioned component A and/or component B. First, components A and B that make up the near infrared light absorption layer will be described.

Component A

Component A is composed of copper ions and a phosphoric ester compound expressed by Formula (1) given above. Specific examples of the copper salt used to supply the copper ions include copper acetate, copper acetate monohydrate, copper formate, copper stearate, copper benzoate, copper ethylacetoacetate, copper pyrophosphate, copper naphtenate, copper citrate, and other such copper salt anhydrides and hydrates of organic acids, as well as copper hydroxide, copper chloride, copper sulfate, copper nitrate, basic copper carbonate, and other such copper salt anhydrides and hydrates of inorganic acids.

Of these, copper acetate, copper acetate monohydrate, copper benzoate, copper hydroxide, and basic copper carbonate can be used to particular advantage. Component A may contain other metal ions besides copper ions (hereinafter referred to as "other metal ions"), and examples of other metal ions include ions from metals such as sodium, potassium, calcium, iron, manganese, magnesium, and nickel.

The above-mentioned phosphoric ester compound is manufactured by any of the following first, second, and third methods, for example.

First Method

This first method involves reacting phosphorus pentoxide with a compound expressed by the following Formula (12) in a suitable organic solvent (or without a solvent)

In Formula (12), R is a group expressed by the above-mentioned Formula (2), (3), (4), (5), (6), (7), (8), or (9), an alkyl group, an aryl group, an aralkyl group, or an alkenyl group. Specifically, an alcohol, alkyl alcohol, phenol, etc., expressed by the following Formula (13), (14), (15), (16), (17), (18), (19), or (20) can be used favorably as the compound expressed by the above Formula (12).

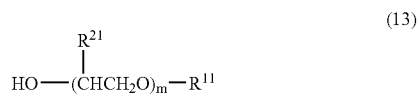

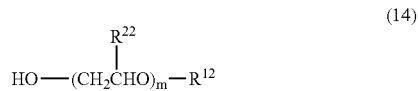

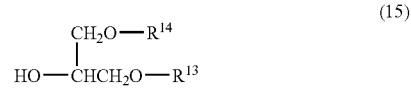

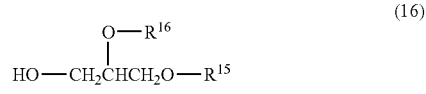

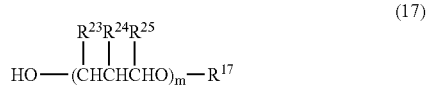

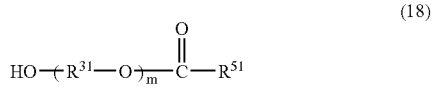

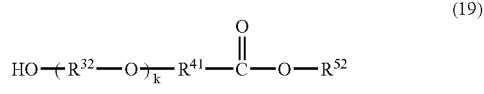

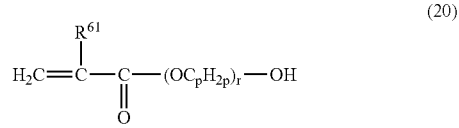

(20)

In Formulas (13) to (20), $R^{11}$ to $R^{17}$ are $C_1$ to $C_{20}$ alkyl groups or $C_6$ to $C_{20}$ aryl groups or aralkyl groups (where the one or more hydrogen atoms bonded to the carbon atoms that make up aromatic rings may be substituted with $C_1$ to $C_6$ alkyl groups or halogens), $R^{21}$ to $R^{25}$ are hydrogen atoms or $C_1$ to $C_4$ alkyl groups (where $R^{23}$, $R^{24}$, and $R^{25}$ cannot all be hydrogen atoms), $R^{31}$ and $R^{32}$ are $C_1$ to $C_6$ alkylene groups, $R^{41}$ is a $C_1$ to $C_{10}$ alkylene group, $R^{51}$ and $R^{52}$ are $C_1$ to $C_{20}$ alkyl groups, $R^{61}$ is a hydrogen atom or methyl group, m is an integer from 1 to 6, k is an integer from 0 to 5, p is an integer from 2 to 97, and r is an integer from 1 to 4.

Of the compounds expressed by Formula (12), specific favorable examples of the alcohols expressed by Formula (13) that have aryl groups or aralkyl groups include the alcohols expressed by the following Formulas (21) and (22). Specific favorable examples of the alcohols expressed by Formula (15) that have aryl groups include the alcohols expressed by the following Formula (23). Specific favorable examples of the alcohols expressed by Formula (17) include the alcohols expressed by the following Formula (24).

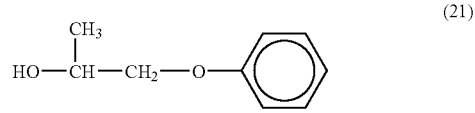

(21)

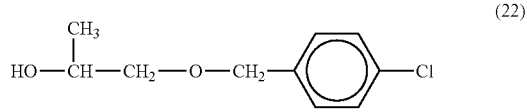

(22)

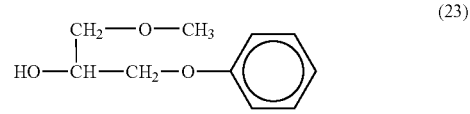

(23)

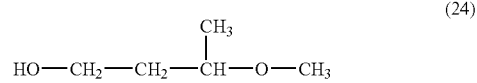

(24)

As mentioned above, phenol is included among the compounds expressed by Formula (12), but in the present invention, the compounds expressed by Formula (12) will hereinafter be collectively referred to as "designated alcohols" for the sake of convenience.

The organic solvent used in the reaction between the designated alcohol and the phosphorus pentoxide is one that will not react with phosphorus pentoxide, examples of which include hexane, cyclohexane, heptane, octane, benzene, toluene, xylene, petroleum spirits, and other such hydrocarbon solvents; chloroform, carbon tetrachloride, dichloroethane, chlorobenzene, and other such halogenated hydrocarbon solvents; diethyl ether, diisopropyl ether, dibutyl ether, tetrahydrofuran, and other such ether solvents; and acetone, methyl ethyl ketone, dibutyl ketone, and other such ketone solvents. Of these, toluene and xylene are preferred.

In this "first method," the reaction conditions for the designated alcohol and the phosphorus pentoxide include a reaction temperature of 0 to 100° C., and preferably 40 to 80° C., and a reaction temperature of 1 to 24 hours, and preferably 4 to 9 hours, when the designated alcohol is an alcohol expressed by any of Formulas (13) to (20) (excepting those having aromatic rings).

If the designated alcohol is phenol or one of the alcohols expressed by Formulas (13) to (17) that have an aromatic ring, the reaction temperature is 0 to 100° C., and preferably 40 to 80° C., and the reaction time is 1 to 96 hours, and preferably 4 to 72 hours.

Also, in this first method, if the designated alcohol and the phosphorus pentoxide are used in a molar ratio of 3:1, for instance, the resulting compound will be an approximately 1:1 mixture of a phosphoric monoester compound in which the number of hydroxyl groups in Formula (1) is 2 (n=2 in Formula (1)) (hereinafter referred to as a "monoester") and a phosphoric diester compound in which the number of hydroxyl groups in Formula (1) is 1 (n=1 in Formula (1)) (hereinafter referred to as a "diester"). The reaction conditions and the proportions of the designated alcohol and phosphorus pentoxide can also be selected as needed so as to adjust the molar ratio of monoester to diester to a range of 99:1 to 40:60.

Second Method

This second method involves reacting a designated alcohol with a phosphorus oxyhalide in a suitable organic solvent (or without a solvent), and hydrolyzing the product thus obtained by adding water. The phosphorus oxyhalide is preferably phosphorus oxychloride or phosphorus oxybromide, with phosphorus oxychloride being particularly favorable.

The organic solvent used in the reaction between the designated alcohol and the phosphorus oxyhalide is one that will not react with a phosphorus oxyhalide, examples of which include hexane, cyclohexane, heptane, octane, benzene, toluene, xylene, petroleum spirits, and other such hydrocarbon solvents; chloroform, carbon tetrachloride, dichloroethane, chlorobenzene, and other such halogenated hydrocarbon solvents; and diethyl ether, diisopropyl ether, dibutyl ether, and other such ether solvents. Of these, toluene and xylene are preferred.

The reaction conditions for the designated alcohol and the phosphorus oxyhalide include a reaction temperature of 0 to 110° C., and preferably 40 to 80° C., and a reaction temperature of 1 to 20 hours, and preferably 2 to 8 hours. Also, a monoester can be obtained in this second method by using the designated alcohol and the phosphorus oxyhalide in a molar ratio of 1:1.

When a designated alcohol expressed by Formula (14), (16), (17) (when $R^{23}$ is a hydrogen atom), (18), or (20) is used, in addition to selecting the reaction conditions and the proportions of the designated alcohol and phosphorus oxyhalide, it is favorable to use a reaction catalyst, such as titanium tetrachloride ($TiCl_4$), magnesium chloride ($MgCl_2$), aluminum chloride ($AlCl_3$), or another such Lewis acid catalyst, and a catcher for by-product hydrochloric acid, such as triethylamine, tributylamine, or another such amine, or pyridine.

A mixture of a monoester and a diester can be obtained by using the above-mentioned reaction catalyst and hydrochloric acid catcher. The conditions pertaining to the reaction, including the reaction catalyst and the proportions of the designated alcohol and phosphorus oxyhalide, can also be selected as needed so as to adjust the molar ratio of monoester to diester to a range of 99:1 to 1:99.

When a designated alcohol expressed by Formula (13), (15), (17) (when $R^{23}$ is an alkyl group), or (19) is used, the reaction conditions and the proportions of the designated alcohol and phosphorus oxyhalide are selected, and a Lewis acid catalyst and a hydrochloric acid catcher are used so as to obtain a mixture of a monoester and a diester, in which case the molar ratio thereof is adjusted to between 99:1 and 1:99.

If the designated alcohol is one with a small number m of repeating units of the alkylene oxide groups, the resulting phosphoric ester compound will be water soluble, so if an amine or other hydrochloric acid catcher is used, it will tend to be difficult to remove the resulting amine hydrochloride by washing with water. The amount in which the above-mentioned reaction catalyst is used is 0.005 to 0.2 mol, and preferably 0.01 to 0.05 mol, per mole of phosphorus oxyhalide.

Third Method

This third method involves reacting a designated alcohol with a phosphorus trihalide in a suitable organic solvent (or without a solvent) to synthesize a phosphonic ester compound, and then oxidizing the resulting phosphonic ester compound. The phosphorus trihalide is preferably phosphorus trichloride or phosphorus tribromide, with phosphorus trichloride being particularly favorable.

The organic solvent used in the reaction between the designated alcohol and the phosphorus trihalide is one that will not react with a phosphorus trihalide, examples of which include hexane, cyclohexane, heptane, octane, benzene, toluene, xylene, petroleum spirits, and other such hydrocarbon solvents; chloroform, carbon tetrachloride, dichloroethane, chlorobenzene, and other such halogenated hydrocarbon solvents; and diethyl ether, diisopropyl ether, dibutyl ether, and other such ether solvents. Of these, hexane and heptane are preferred.

The reaction conditions for the designated alcohol and the phosphorus trihalide include a reaction temperature of 0 to 90° C., and preferably 40 to 75° C., and a reaction temperature of 1 to 10 hours, and preferably 2 to 5 hours.

The means for oxidizing the phosphonic ester compound can be to synthesize a phosphorohalidate compound, and then hydrolyze this phosphorohalidate compound. The reaction temperature of the phosphonic ester compound and the halogen here should be 0 to 40° C., and preferably 5 to 25° C.

This phosphonic ester compound may also be refined by distilling prior to being oxidized. In this third method, a diester of high purity can be obtained, for example, by using the designated alcohol and the phosphorus trihalide in a molar ratio of 3:1. A mixture of a monoester and a diester can be obtained by selecting the reaction conditions and the proportions of the designated alcohol and phosphorus trihalide, in which case the molar ratio is adjusted to between 99:1 and 1:99.

Specific examples of the first phosphoric ester compound obtained with the first to third methods given above include compounds expressed by the following Formula (25)-a, the following Formula (25)-b, the following Formulas (26)-a to (26)-x, the following Formulas (27)-a to (27)-x, the following Formulas (28)-a to (28)-v, and the following Formulas (29)-a to (29)-n.

These phosphoric ester compounds can be used singly or in combinations of two or more types, and from the standpoint of near infrared light absorption characteristics in copper compounds thereof, phosphoric ester compounds expressed by Formula (25)-b, Formulas (27)-a to (27)-x, Formulas (28)-a to (28)-v, and Formulas (29)-a to (29)-n are preferable, with the phosphoric ester compounds expressed by Formulas (28)-s to (28)-v being particularly favorable.

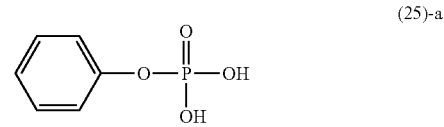

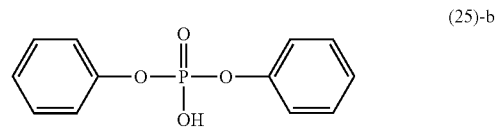

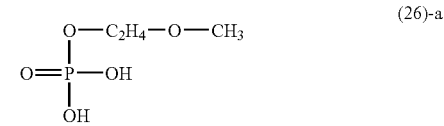

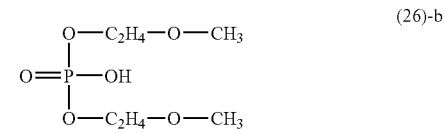

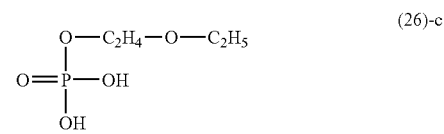

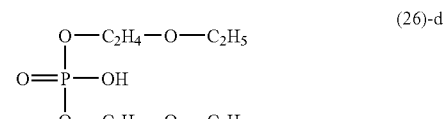

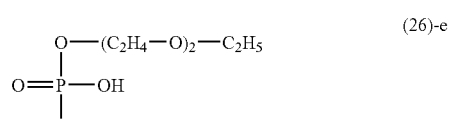

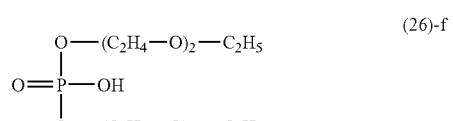

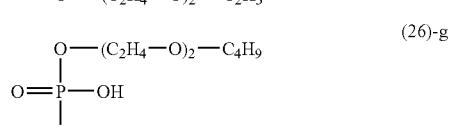

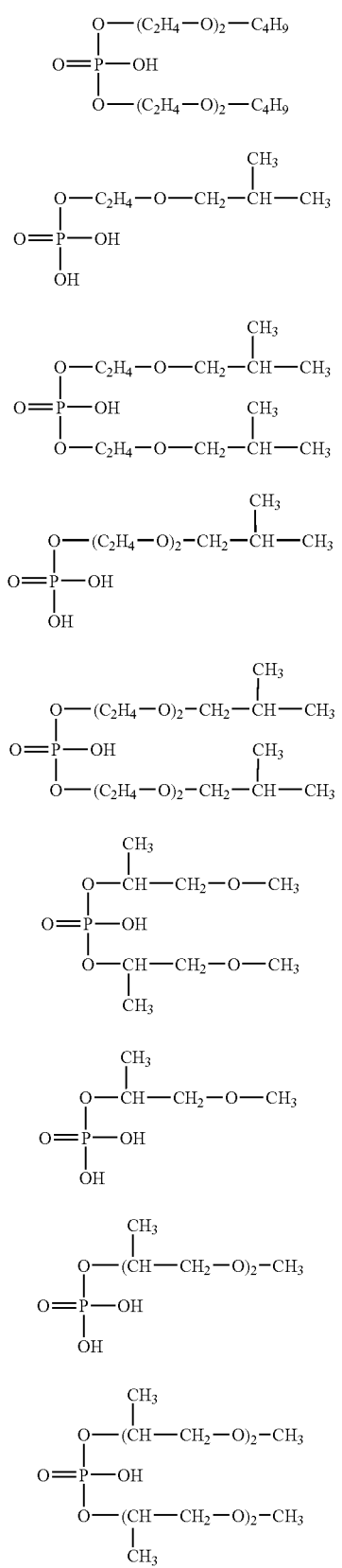
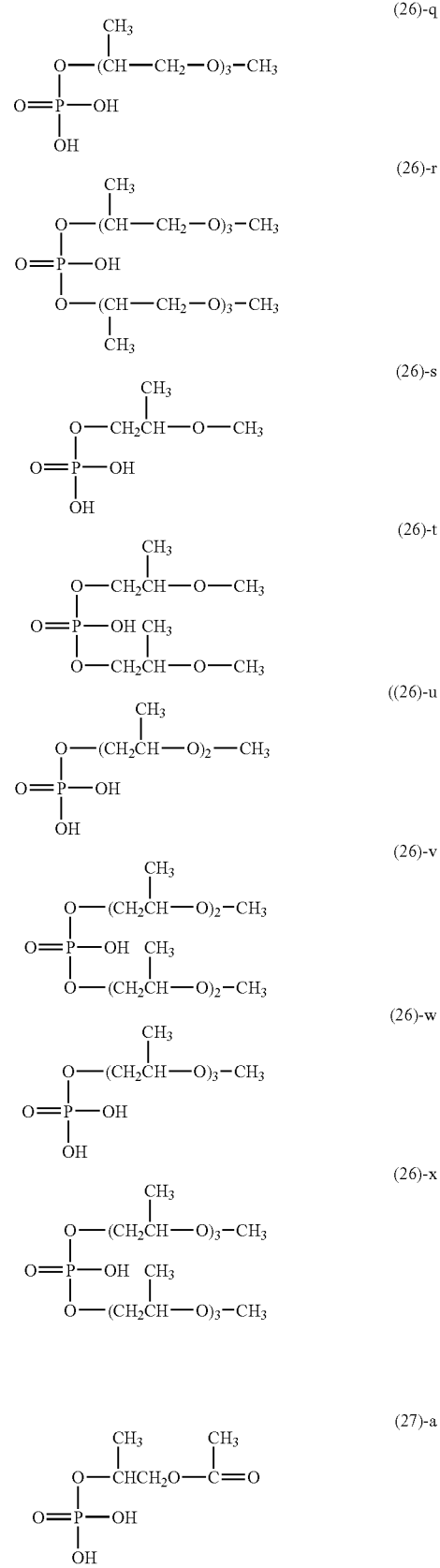

-continued
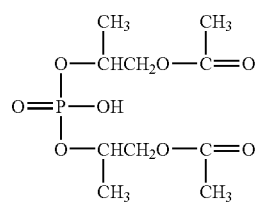
(27)-b
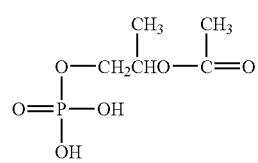
(27)-c
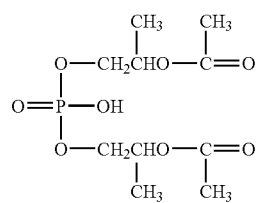
(27)-d
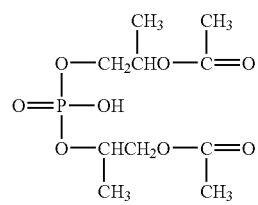
(27)-e
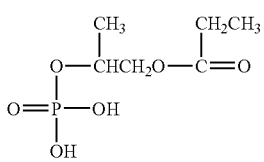
(27)-f
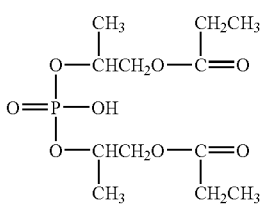
(27)-g
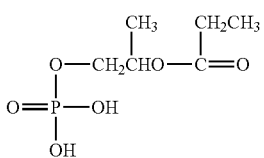
(27)-h
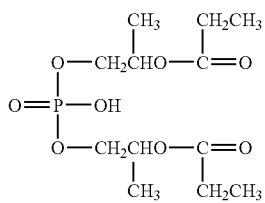
(27)-i
-continued
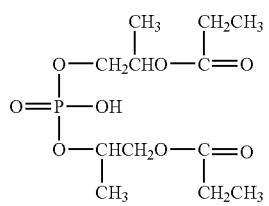
(27)-j
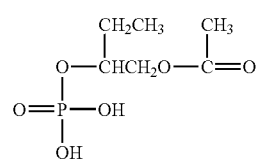
(27)-k
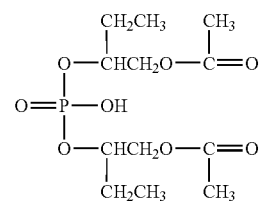
(27)-l
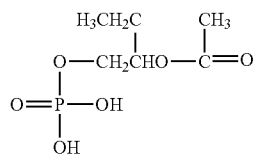
(27)-m
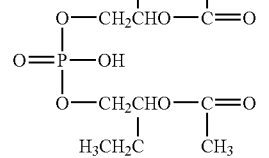
(27)-n
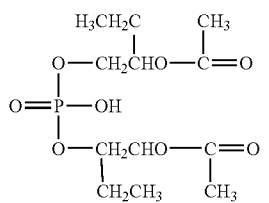
(27)-o
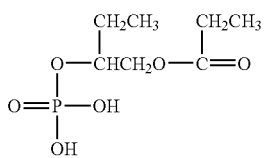
(27)-p
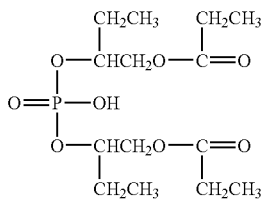
(27)-q

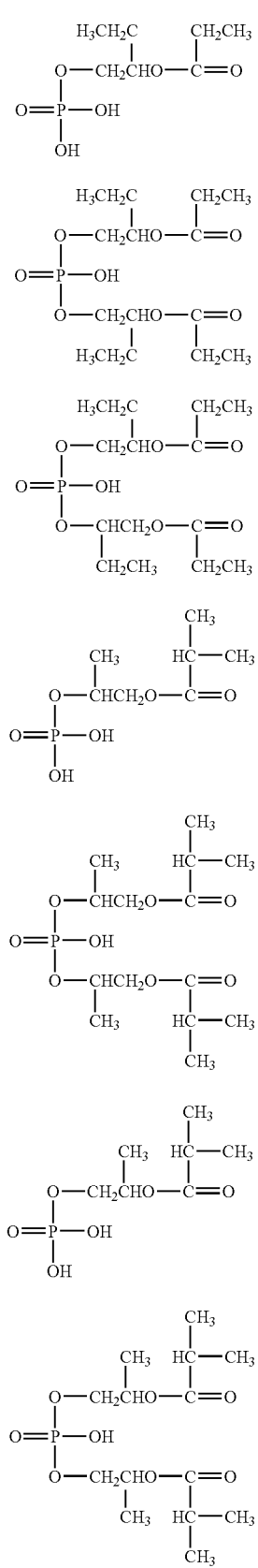
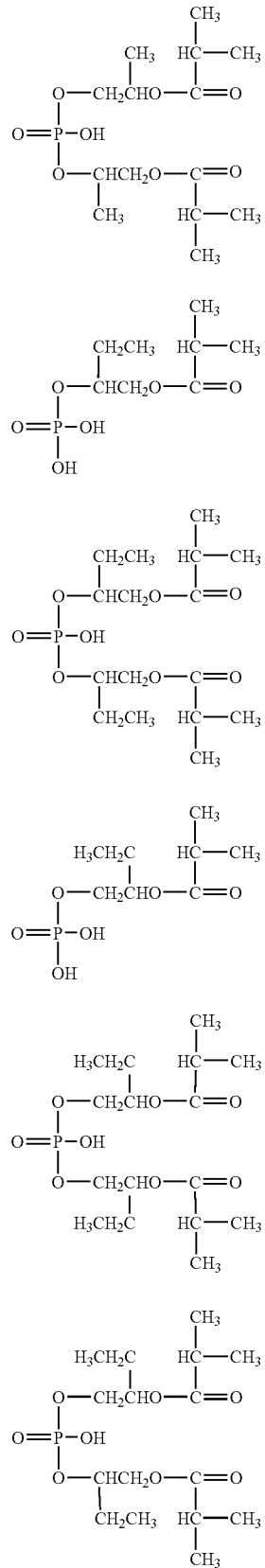

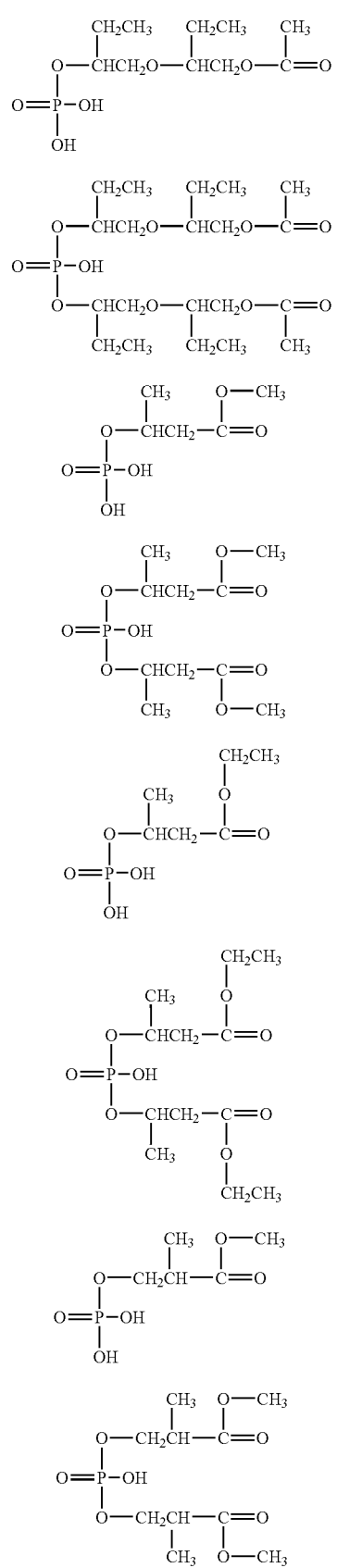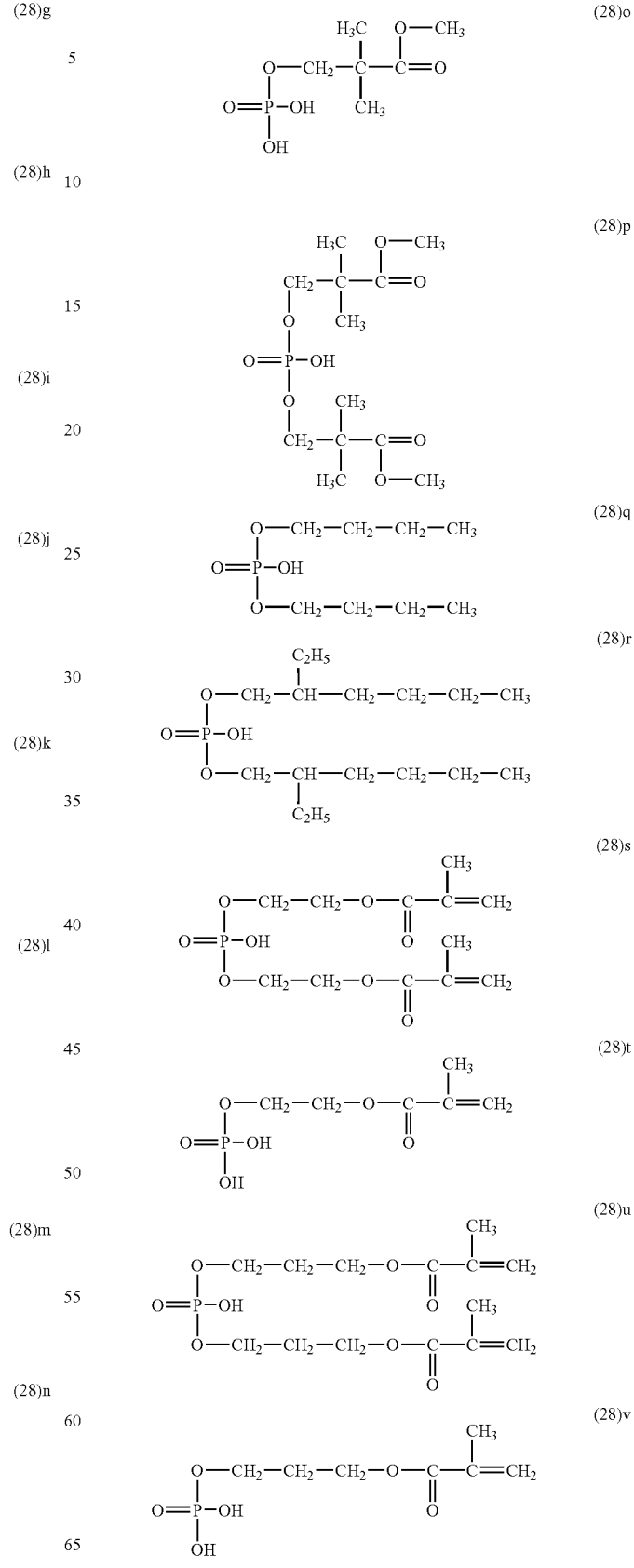

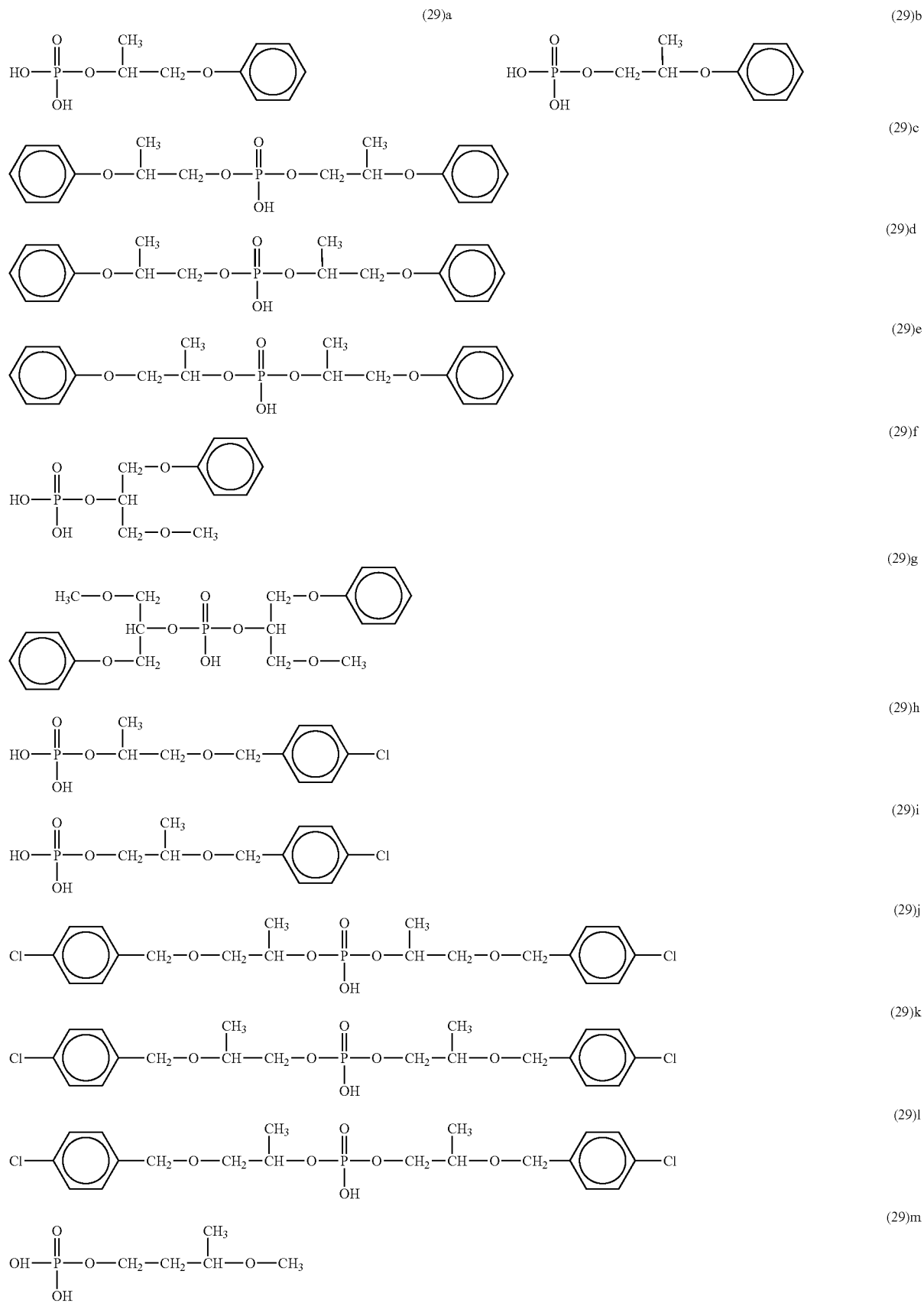

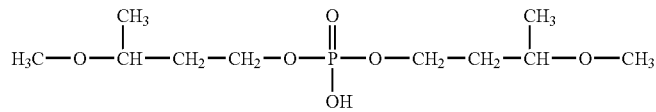

(29)n

Component B

Component B is composed of a copper phosphate compound obtained through a reaction between the above-mentioned phosphoric ester compound and a copper compound. The copper salts discussed above can be used as the copper compound, and the reaction between the above-mentioned phosphoric ester compound (hereinafter referred to as the "designated phosphoric ester compound") and the copper salt can be conducted by bringing the two components into contact under the appropriate conditions. More specifically, the following methods (i), (ii), and (iii) can be used, for example.

(i) A method in which the designated phosphoric ester compound and the copper salt are mixed and reacted.

(ii) A method in which the designated phosphoric ester compound and the copper salt are reacted in a suitable organic solvent.

(iii) A method in which an organic solvent layer comprising the designated phosphoric ester compound contained in an organic solvent is brought into contact with an aqueous layer in which a copper salt is dissolved or dispersed, thereby reacting the designated phosphoric ester compound and the copper salt.

The reaction conditions for this designated phosphoric ester compound and the copper salt include a reaction temperature of 0 to 150° C., and preferably 20 to 120° C., and a reaction time of 0.5 to 15 hours, and preferably 1 to 10 hours, with 1 to 7 hours being even better.

There are no particular restrictions on the organic solvent used in the above-mentioned method (ii) as long as it allows the dissolution or dispersion of the designated phosphoric ester compound being used, but examples include benzene, toluene, xylene, and other aromatic compounds; methyl alcohol, ethyl alcohol, isopropyl alcohol, and other alcohols; methyl cellosolve, ethyl cellosolve, and other glycol ethers; diethyl ether, diisopropyl ether, dibutyl ether, and other ethers; acetone, methyl ethyl ketone, and other ketones; ethyl acetate and other esters; and hexane, kerosene, and petroleum ether.

It is also possible to use a polymerizable organic solvent such as a (meth)acrylate or other (meth)acrylic ester, styrene, α-methylstyrene, or another such aromatic vinyl compound.

Meanwhile, there are no particular restrictions on the organic solvent used in the above-mentioned method (iii) as long as it is insoluble or dissolves poorly in water, and allows the dissolution or dispersion of the designated phosphoric ester compound being used, but of the examples of the organic solvent used in method (ii), those that can be used include aromatic compounds, ethers, esters, hexane, kerosene, (meth)acrylic esters, and aromatic vinyl compounds.

When an acid salt is used as the copper salt, the acid component, which is an anion, will be freed from the copper salt in the reaction between the designated phosphoric ester compound and the copper salt. This acid component is preferably removed as needed, because it can lead to a decrease in the thermal stability and moisture resistance of the resin composition produced when component A and/or component B is dissolved or dispersed in a resin.

When a copper phosphate compound is manufactured by the above-mentioned method (i) or (ii), the acid component produced after the designated phosphoric ester compound has reacted with the copper salt (the organic solvent and the produced acid component in method (ii)) can be distilled off.

When a copper phosphate compound is manufactured by the above-mentioned method (iii), a favorable method for removing the acid component is to add an alkali to the organic solvent layer comprising the designated phosphoric ester compound contained in an organic solvent, thereby neutralizing this layer, and then bring this organic solvent layer into contact with the aqueous layer in which the copper salt is dissolved or dispersed, thereby reacting the designated phosphoric ester compound and the copper salt, and then separate the organic solvent layer form the aqueous layer.

Examples of the alkali used here include sodium hydroxide, potassium hydroxide, and ammonium, although this list is not comprehensive. With this method, a water-soluble salt is formed by the alkali and the acid component freed from the copper salt, this salt moves into the aqueous layer, and the designated phosphoric ester compound that is produced moves into the organic solvent layer, so the acid component can be removed by separating the aqueous layer from the organic solvent layer.

The number m of repeating units of the alkylene oxide groups in the phosphoric ester compounds expressed by Formulas (2), (3), (6), and (7) is an integer from 1 to 6, and preferably 1 to 3. If the value of m is over 6, there will be a severe decrease in hardness when a resin composition is produced, for instance. On the other hand, if the value of m is zero, that is, if no alkylene oxide group is bonded, then when a resin composition is produced it will be difficult to disperse the copper ions in the resin.

The number k of repeating units of the alkylene oxide groups in Formula (8) is an integer from 0 to 5, and preferably 0 to 2. If the value of k is over 5, hardness will tend to decrease when a resin composition is produced. The number r of repeating units of the alkylene oxide groups in Formula (9) is an integer from 1 to 4. If the value of r is over 4, moisture absorption will be so high when a resin composition is produced that a molded article will be prone to expansion and contraction. In particular, expansion and contraction caused by changes in humidity in the surrounding environment can exacerbate the deterioration of a surface covering layer if such a layer is present, for example.

Also, if the value of r is over 4, the rigidity or hardness of a molded article will decrease, and it will tend to be difficult to obtain the desired mechanical strength that is necessary for a flat material. Furthermore, if the value of r is over 4, the resulting molded article may not have adequate heat resistance.

From the standpoint of the thermal stability of the phosphoric ester compound and the copper phosphate compound, it is particularly favorable for the number m of repeating units of the alkylene oxide groups to be 1.

Copper phosphate compounds and copper salts of phosphoric ester compounds having alkylene oxide groups in which this m is 1 tend to have a higher pyrolysis temperature than compounds having alkylene oxide groups in which this m is 2 or greater, so the molding temperature can be higher in the hot molding of compositions containing copper phosphate compounds and copper salts of phosphoric ester compounds having alkylene oxide groups in which m is 1. Thus, the molding is easier and workability can be improved.

Also, copper phosphate compounds and copper salts of phosphoric ester compounds having alkylene oxide groups in which this m is 1 tend to have better moisture resistance than compounds having alkylene oxide groups in which this m is 2 or greater. In specific terms, optical filters made from copper phosphate compounds and copper salts of phosphoric ester compounds having alkylene oxide groups in which this m is 1 undergo substantially no deterioration over time in their visible light transmissivity in environments of high temperature and humidity, whereas those having alkylene oxide groups in which this m is 2 or greater tend to deteriorate relatively readily over time.

As mentioned above, a monoester or diester is used as the designated phosphoric ester compound, but with a triester, in which no hydroxyl group is bonded in Formula (1), it is difficult to disperse the copper ions in a resin when a resin composition is produced, for example, because there are no hydroxyl groups with which the copper ions can undergo coordination bonding and/or ion bonding.

$R^{11}$ to $R^{17}$ in Formulas (2) to (6) are $C_{1\ to\ C20}$ alkyl groups (with 1 to 10 carbons being preferable, 1 to 4 being even better, and 1 or 2 being particularly favorable), or $C_6$ to $C_{20}$ aryl groups or aralkyl groups (where the one or more hydrogen atoms bonded to the carbon atoms that make up aromatic rings may be substituted with $C_1$ to $C_6$ alkyl groups or halogens).

$R^{51}$ in Formula (7) and $R^{52}$ in Formula (8) are $C_1$ to $C_{20}$ alkyl groups with 1 to 10 carbons being preferable, 1 to 4 being even better, and 1 or 2 being particularly favorable). When a phosphoric ester compound in which the carbon numbers of $R^{11}$ to $R^{17}$ and $R^{51}$ and $R^{52}$ are over 20 is made into a resin composition, there may be a drop in the miscibility with the resin, making it difficult to disperse the copper ions in the resin.

$R^{21}$ in Formula (2), $R^{22}$ in Formula (3), and $R^{23}$ to $R^{25}$ in Formula (6) are hydrogen atoms or $C_1$ to $C_4$ alkyl groups (where $R^{23}$, $R^{24}$, and $R^{25}$ cannot all be hydrogen atoms). Specifically, examples of the alkylene oxide groups in Formulas (2) and (3) include the buthylene oxide group and propylene oxide group, and examples of the alkylene oxide groups in Formulas (6) include the butylene oxide group. Of these, compounds having propylene oxide groups are preferred.

If the carbon numbers of $R^{21}$ to $R^{25}$ are over 4, it will be difficult to disperse component A and/or component B at a high proportion in a solvent or resin.

$R^{31}$ in Formula (7) and $R^{32}$ in Formula (8) are $C_{1\ to\ C6}$ alkylene groups (with 1 to 4 carbons being preferable, 3 or 4 being even better, and 3 being particularly favorable). Specifically, examples of alkylene oxide groups ($OR^{31}$ and $OR^{32}$) include a methyleneoxy group, ethyleneoxy group, propyleneoxy group, butyleneoxy group, pentyleneoxy group, and hexyleneoxy group, with a propyleneoxy group and butyleneoxy group being particularly favorable.

If the carbon numbers of $R^{31}$ and $R^{32}$ are over 6, it will be difficult to disperse component A and/or component B at a high proportion in a solvent or resin. $R^{41}$ in Formula (8) is a $C_1$ to $C_{10}$ alkylene group (with 3 to 6 carbons being preferable, 3 or 4 being even better, and 3 being particularly favorable). $R^{61}$ in Formula (9) is a hydrogen atom or methyl group.

With the optical filter of the present invention, which comprises a near infrared light absorption layer containing component A and/or component B, the phosphoric acid groups of the designated phosphoric ester compound are bonded to the copper ions by coordination bonding and/or ion bonding, these copper ions are dissolved or dispersed in the near infrared light absorption layer in a state of being surrounded by the phosphoric ester, and near infrared light is selectively absorbed through electronic transition between the d orbits of these copper ions.

Here, the proportion in which the copper ions are contained in the near infrared light absorption layer composed of component A and/or component B should be adjusted to 2 to 60 wt %, and preferably 2 to 20 wt %, and even more preferably 2 to 15 wt %, with respect to the entire near infrared light absorption layer. If this copper ion content is less than 2 wt %, then when the thickness of the optical filter or near infrared light absorption layer is reduced to about 1 mm, it will tend to be difficult to obtain satisfactory near infrared light absorption.

On the other hand, if the copper ion content is over 60 wt %, it will tend to be difficult to disperse the copper ions in the near infrared light absorption layer. As mentioned above, the near infrared light absorption layer will exhibit the same tendency when formed from a resin composition containing component A and/or component B.

The above-mentioned metal ions are preferably used in a proportion of no more than 50 wt % out of all the metal ions including the copper ions. 30 wt % or less is even better, and 20 wt % or less is especially favorable. If this proportion is over 50 wt %, the bonding coordination between the copper ions and the phosphoric ester compound will be affected by the other metal ions, and the near infrared light absorption will tend not to be raised sufficiently.

The ratio in which the designated phosphoric ester compound and the copper ions are contained in the near infrared light absorption layer is adjusted so that the phosphorus atom content in the near infrared light absorption layer will be 0.4 to 1.3 mol per mole of copper ions, that is, so that the P/Cu molar ratio will be 0.4 to 1.3, and preferably 0.8 to 1.3.

If the P/Cu molar ratio is less than 0.4, there will be an excess of copper ions coordinated with respect to the designated phosphoric ester compound, and the copper ions will tend not to disperse uniformly in the near infrared light absorption layer. The same tendency is seen when the near infrared light absorption layer is formed from the above-mentioned resin composition.

On the other hand, if the P/Cu molar ratio is over 1.3, devitrification will tend to occur more readily when the thickness of the optical filter is reduced and the copper ion content is raised as mentioned above so as to be at least 2 wt % versus the with respect to the entire near infrared light absorption layer, and this tendency will be particularly pronounced in environments of high humidity and temperature.

Therefore, with the optical filter of the present invention, the P/Cu molar ratio in the near infrared light absorption layer is set to between 0.4 and 1.3, so the copper ions are uniformly dispersed in the near infrared light absorption layer, good near infrared light absorption is obtained, and even if the thickness is reduced and the copper ion content raised, it will still be possible to obtain an optical filter with extremely good moisture resistance.

In particular, the dispersibility of the copper ions in the resin can be reliably and sufficiently raised if this molar ratio is at least 0.8. Thus, if the P/Cu molar ratio in the near infrared light absorption layer is set to between 0.8 and 1.3, the copper ions will be uniformly dispersed in the near infrared light absorption layer, even better near infrared light absorption will be obtained, and an optical filter with even more superior moisture resistance can be obtained.

Furthermore, if the designated phosphoric ester compound is such that $R^{61}$ in Formula (9) is a methyl group, p in Formula (9) is 2 or 3, and r in Formula (9) is 1 (that is, if it is the phosphoric ester compound expressed by Formula (10), or the phosphoric ester compound expressed by Formula (11)), then the near infrared light absorption will be markedly higher than with a phosphoric ester compound having methacryloyloxyalkyl groups expressed by Formula (9) and including alkylene oxide groups in which p is at least 4.

It is therefore possible to raise the selective absorption of near infrared light of the optical filter, and to raise its selective transmission of visible light. If r (the repeat number of these alkylene oxide groups) is 1, there will be substantially no deterioration in the visible light transmissivity of the optical filter over time. Thus, the improvement in the moisture resistance of the optical filter will be even better. In contrast, with an optical filter in which r is 2 or greater, and especially one in which the number of alkylene oxide groups is an integer over 4, there will be a tendency for moisture resistance, rigidity, heat resistance, and so forth to deteriorate more readily over time.

Of the phosphoric ester compounds expressed by Formula (1), if a mixture of a phosphoric ester compound having an aromatic ring and a phosphoric ester compound not having an aromatic ring is used, the resulting optical filter will have improved transmissivity on the visible light side in the wavelength band at the boundary between visible light and near infrared light (a wavelength of roughly 750 nm), and improved absorption on the near infrared light side in this wavelength band.

In particular, if the phosphoric ester compound having an aromatic ring is a compound expressed by Formula (25)-a and/or Formula (25)-b, and preferably Formula (25)-b, the selective absorption of near infrared light and the selective transmission of visible light will be superior, and the solubility of component A and/or component B in a solvent will be higher in obtaining a liquid composition (discussed below).

The ratio in which the phosphoric ester compound having an aromatic ring and/or a copper compound thereof, and the phosphoric ester compound not having an aromatic ring and/or a copper compound thereof are contained here is a weight ratio of from 10:90 to 90:10, and preferably 40:60 to 90:10, with a range of 60:40 to 85:15 being particularly favorable.

The near infrared light absorption layer that makes up the optical filter of the present invention may be formed from just component A and/or component B, or it may be formed from a resin composition in which these components are contained in a resin, as discussed above. The near infrared light absorption layer may also be formed by dissolving or dispersing the above-mentioned components in a solvent, coating a substrate with the resulting liquid composition, and evaporating off the solvent. Naturally, the entire optical filter may also be formed from the near infrared light absorption layer.

Liquid compositions, resin compositions, and adhesive resin compositions (a kind of resin composition) that are favorable for forming the near infrared light absorption layer will now be described.

Liquid Compositions

As discussed above, a liquid composition comprises component A and/or component B dissolved or dispersed in a solvent, and as long as the thin-film near infrared light absorption layer produced by evaporating off the solvent will be optically transparent, the liquid composition itself may be transparent, semi-transparent, or opaque.

The solvent here can be water or an organic solvent. Examples of organic solvents include methyl alcohol, ethyl alcohol, isopropyl alcohol, butyl alcohol, and other alcohols; methyl cellosolve, ethyl cellosolve, and other glycol ethers; diethyl ether, diisopropyl ether, and other ethers; acetone, methyl ethyl ketone, methyl isobutyl ketone, cyclohexanone, and other ketones; ethyl acetate, isopropyl acetate, butyl acetate, butyl cellosolve acetate, and other esters; benzene, toluene, xylene, and other aromatic compounds; and hexane, kerosene, and petroleum ether.

Other solvents that can be used are polymerizable organic solvents such as the monomer that makes up the resin (as described under the heading "Resin composition" below) such as a (meth)acrylate or other (meth)acrylic ester, styrene, α-methylstyrene, or another such aromatic vinyl compound.

The proportion in which component A and/or component B is contained in this liquid composition will vary with the type of solvent used and with the application or intended use of the optical filter, but from the standpoint of viscosity after preparation, the amount is usually adjusted to a range of 0.1 to 1900 mass parts, and preferably 1 to 900 mass parts, and even more preferably 5 to 400 mass parts, per 100 mass parts solvent.

The optical filter of the present invention can be obtained with the greatest of ease by using this liquid composition to coat a thin glass or resin material (such as a thin resin sheet or film) or the like that is translucent to visible light. It is simplicity itself to provide a thin-film optical filter on a surface having any of various sizes or shapes merely by coating the desired location or side of an article with this liquid composition, and this is extremely useful when the optical filter is provided over a large surface area. Furthermore, if the solvent is a resin or monomer, it will be exceedingly easy to obtain a near infrared light absorption material in the form of a thin film of a resin or the like.

Resin Composition

The above-mentioned component A and component B both have excellent miscibility with resins, and since the copper ions are dispersed well in the resin, as mentioned above, a resin composition having excellent near infrared light absorption can be obtained. This resin composition may be a monomer composition, or a polymer composition may be obtained by polymerizing a monomer composition.

There are no particular restrictions on the monomer that makes up this resin composition as long as it is a resin with excellent dispersibility in component A and/or component B, but the following acrylic resins, or monomers other than acrylic resins, can be used to advantage.

A polymer obtained from a (meth) acrylic ester monomer can be used favorably as an acrylic resin. Specific examples of (meth)acrylic ester monomers include methyl (meth)

acrylate, ethyl (meth)acrylate, n-propyl (meth)acrylate, n-butyl (meth)acrylate, isobutyl (meth)acrylate, tert-butyl (meth)acrylate, n-hexyl (meth)acrylate, n-octyl (meth)acrylate, and other alkyl (meth) acrylates; glycidyl (meth) acrylate, 2-hydroxyethyl (meth)acrylate, 2-hydroxypropyl (meth)acrylate, hydroxybutyl (meth)acrylate, isobornyl (meth)acrylate, methoxypolyethylene (meth)acrylate, phenoxy (meth)acrylate, and other modified (meth)acrylates; and ethylene glycol di(meth)acrylate, diethylene glycol di(meth)acrylate, polyethylene glycol di(meth)acrylate, polypropylene glycol di(meth)acrylate, 1,3-butylene glycol di(meth)acrylate, 1,4-butanediol di(meth)acrylate, 1,6-hexanediol di(meth)acrylate, neopentyl glycol di(meth)acrylate, 2-hydroxy-1,3-di(meth)acrylate, 2,2-bis[4-(meth)acryloxyethoxyphenyl]propane, 2-hydroxy-1-(meth)acryloxy-3-(meth)acryloxypropane, trimethylolpropane tri(meth)acrylate, pentaerythritol tri(meth)acrylate, pentaerythritol tetra (meth)acrylate, and other polyfunctional (meth)acrylates.

Putting "meth" in parentheses as above is a notational method used for the sake of convenience and simplicity when there is a need to indicate both acrylic acid or derivatives thereof and methacrylic acid or derivatives thereof, and this method is employed in the present invention as well.

Another acrylic resin that can be used in a copolymer of the above-mentioned (meth)acrylic ester monomer with another monomer that is copolymerizable with this (meth) acrylic ester monomer.

Specific examples of such copolymerizable monomers include (meth)acrylic acid, 2-(meth)acryloyloxyethyl-succinic acid, 2-(meth)acryloyloxyethylphthalic acid, and other unsaturated carboxylic acids; N,N-dimethylacrylamide, and other acrylamides; and styrene, α-methylstyrene, chlorostyrene, dibromostyrene, methoxystyrene, vinylbenzoic acid, hydroxymethylstyrene, and other aromatic vinyl compounds. Examples of other resins besides acrylic resins include polyethylene terephthalate (PET), polyethylene, polypropylene, polyvinyl chloride, polycarbonate, and styrene, α-methylstyrene, chlorostyrene, dibromostyrene, methoxystyrene, vinylbenzoic acid, hydroxymethylstyrene, and other aromatic vinyl compounds, and other such polymers. The above monomers can be used singly or in combinations of two or more types.

When just a monofunctional monomer is used, a thermoplastic resin will be obtained, but when all or part of the monomer is polyfunctional, a thermosetting resin will be obtained, so these resin compositions can be suitably selected so as to obtain an optical filter suited to the intended use, application, molding method, and so forth. Of these, if a thermoplastic resin is used, remolding will be easier after polymerization curing, which makes it easier to work the optical filter.

The resin composition is prepared by adding component A and/or component B to the above-mentioned resin. The proportion in which component A and/or component B is contained will vary with the application or intended use of the optical filter, but from the standpoint of formability (or moldability), the amount is usually adjusted to a range of 0.1 to 400 mass parts, and preferably 0.3 to 200 mass parts, and even more preferably 1 to 100 mass parts, per 100 mass parts resin.

The proportion of copper ions in the resin composition should be adjusted to a range of 2 to 60 wt %, and preferably 2 to 20 wt %, and even more preferably 2 to 15 wt %, with respect to the overall resin composition. There are no particular restrictions on the specific method used to prepare the resin composition, but the following two methods are favorable.

First Method

This first method involves preparing a monomer composition by adding component A and/or component B to a monomer, and then subjecting this monomer composition to radical polymerization. In this method, there are no particular restrictions on the specific method for conducting the radical polymerization of the monomer composition, and any ordinary radical polymerization method that makes use of a radical polymerization initiator can be used, such as bulk (cast) polymerization, suspension polymerization, emulsion polymerization, solution polymerization, and other such known methods.

Second Method

This second method involves adding component A and/or component B to a resin and mixing. This method is employed when the resin is thermoplastic. More specifically, this can be (1) a method in which component A and/or component B is added to and kneaded with a molten resin or (2) a method in which a resin is dissolved or dispersed in, or swollen with, a suitable organic solvent, component A and/or component B is added to and mixed with this solution, and the organic solvent is then removed from the solution.

In method (1) above, the kneading of the resin with component A and/or component B can be accomplished by any process that is commonly used in the melt kneading of thermoplastic resins, examples of which include melt kneading with a mixing roll, and pre-mixing in a Herschel mixer or the like and then melt kneading in an extruder.

There are no particular restrictions on the organic solvent used in the above method (2) as long as it allows the above-mentioned resin to be dissolved, dispersed, or swollen, but specific examples include methyl alcohol, ethyl alcohol, isopropyl alcohol, and other alcohols; acetone, methyl ethyl ketone, and other ketones; benzene, toluene, xylene, and other aromatic compounds; methylene chloride and other chlorinated hydrocarbons; and dimethylacrylamide, dimethylformamide, and other amide compounds.

In the preparation of the above-mentioned resin composition, when component A is used and a copper salt of an organic or inorganic acid is used as the copper salt, the result of the reaction between the designated phosphoric ester compound and the copper salt will be the freeing of the acid component (an anion) from the copper salt. This acid component is preferably removed as needed. This can be accomplished by (a) a method in which the acid component is extracted by immersing the resin composition in a suitable organic solvent, or (b) a method in which the acid component is precipitated out by cooling the monomer composition prior to its polymerization.

It is preferable for water to be present during the preparation of the resin composition. Specifically, it is preferable for the optical filter to be manufactured by a method comprising a step or mixing or bringing into contact the designated phosphoric ester compound expressed by Formula (1), a copper salt, and water. Put another way, it is preferable for water to be present when the designated phosphoric ester compound and the copper salt are mixed or brought into contact.

This affords a sufficient increase in the stability of the monomer composition. Furthermore, it is possible to increase the transparency of the polymer (the near infrared light absorption layer of the optical filter) obtained by polymerizing the monomer composition. An example of how the water is made to be present here is to add water in the preparation of the monomer composition. More specifically, for example, the designated phosphoric ester compound and the copper salt are added to the monomer that makes up the resin, after which liquid water or gaseous water (steam) is added or introduced. An advantage to this is that it will be easier to dissolve or disperse component A and/or component B in the resin monomer.

This method in which water is added is particularly favorable when copper acetate, copper acetate monohydrate, copper benzoate, or another such copper salt anhydride or hydrate of an organic acid is used as the copper salt. When copper hydroxide, basic copper carbonate, or the like is used as the copper salt, there is no need to remove the acid component as discussed above, but it is preferable to perform reflux dehydration at normal or reduced pressure during the preparation of the monomer composition. This affords the same benefits as when water is made to be present when a copper salt anhydride or hydrate is used as the copper salt, as discussed above.

The reason for this seems to be that adding water to the monomer composition when there is not enough, or removing water when there is an excess amount, increases the stability of the monomer composition, and improves the transparency of the polymer obtained when this monomer composition is polymerized. More exactly, it is surmised that there is a preferable range for the amount of water contained in the monomer composition or polymer thereof, which is neither excessive nor inadequate. Other action mechanisms may instead apply, however.

It is preferable for the monomer composition obtained in this way to contain 0.1 to 5 wt % water (moisture). If this moisture content is under 0.1 wt %, the stability of the monomer composition may not be sufficient, and the transparency of the polymer thereof may not be adequately increased. On the other hand, if the moisture content is over 5 wt %, the polymer may undergo whitening, in which case there is a marked decrease in the transparency of the polymer.

There are no particular restrictions on the organic solvent used in the above method (a) as long as it can dissolve the freed acid component and has appropriate affinity with the resin being used (affinity to the extent that it will penetrate into the resin, but will not dissolve it).

Specific examples of such solvents include methyl alcohol, ethyl alcohol, n-propyl alcohol, isopropyl alcohol, and other lower aliphatic alcohols; acetone, methyl ethyl ketone, and other ketones; diethyl ether, petroleum ether, and other ethers; n-heptane, n-hexane, n-butane, chloroform, methylene chloride, carbon tetrachloride, and other aliphatic hydrocarbons and halides thereof; and benzene, toluene, xylene, and other aromatic compounds.

Meanwhile, in the above method (b), it is preferable for the copper salt that makes up component A to be one with which the freed acid component will not readily dissolve in the monomer, or a copper salt other than an organic acid or inorganic acid salt. Specific examples include copper hydroxide and copper salts of carboxylic acids having an aromatic-ring, such as benzoic acid.

Adhesive Resin Composition

Among compositions containing a resin other than an acrylic resin, those that contain a polyvinyl butyral resin, an ethylene-vinyl acetate copolymer, or a partial saponification product of this copolymer will have superior adhesion to base materials composed of glass or plastic, and will themselves be flexible, and will have little temperature dependence.

Therefore, such a resin composition containing component A and/or component B is an adhesive resin composition, and will provide good adhesion to the substrate even if an adhesive agent is not used. Thus, an optical filter with excellent workability can be obtained more easily, and the resulting optical filter will have greater resistance to temperature changes.

Various plasticizers that are miscible with the resin can be added as other components to the above-mentioned resin composition so as to enhance the dispersibility of the copper ions in the resin component. Specific examples of such plasticizers include tricresyl phosphate, triphenyl phosphate, and other phosphoric ester-based plasticizers; dioctyl phthalate, dibutyl phthalate, and other phthalic acid-based plasticizers; dibutyl sebacate, butyl ricinoleate, methylacetyl ricinoleate, butyl succinate, and other fatty acid-based plasticizers; and butylphthalylbutyl glycolate, triethylene glycol dibutyrate, triethylene glycol di-2-ethyl butyrate, polyethylene glycol, and other glycol-based plasticizers.

Benzotriazole-, benzophenone-, or salicylic acid-based ultraviolet absorbents, other antioxidants, stabilizers, and so forth can also be added.

Examples of favorable application of an optical filter equipped with the above-mentioned near infrared light 4 absorption layer (as mentioned above, the entire optical filter may also be a near infrared light absorption layer) will now be given.

Display Panel

It is extremely favorable for the optical filter of the present invention to be applied to a so-called display panel, which is an electronic display panel such as a plasma display panel (PDP). Some of the emitters provided to these electronic displays emit near infrared light with a wavelength of 800 to 1100 nm, and a problem is that near infrared light emitted from the panel of an electronic display can cause malfunction in television and other near infrared light remote control systems (infrared remotes) used near the electronic display.

In particular, with a PDP, the rare gas (xenon or neon) in the space between the emitter electrodes is subjected to discharge excitation, and a higher intensity near infrared light is emitted than with other kinds of electronic display. In view of this, there is a need for a display panel with better absorption of near infrared light and transmission of visible light.

If the optical filter of the present invention is applied to the substrate (made of glass or resin) of a display panel, for example, it is possible to obtain a display panel with excellent selective absorption of near infrared light and selective transmission of visible light. Furthermore, because of the increased moisture resistance of the optical filter, devitrification of the display panel can be prevented over an extended period, which extends the service life of the display panel.

Also, if the substrate is coated with component A and/or component B itself, or with the above-mentioned liquid composition, and this coating is dried, an optical filter composed of a thin-film near infrared light absorption layer will be formed on the surface of the display panel. An example of such a display panel will now be described.

Figure 1B:
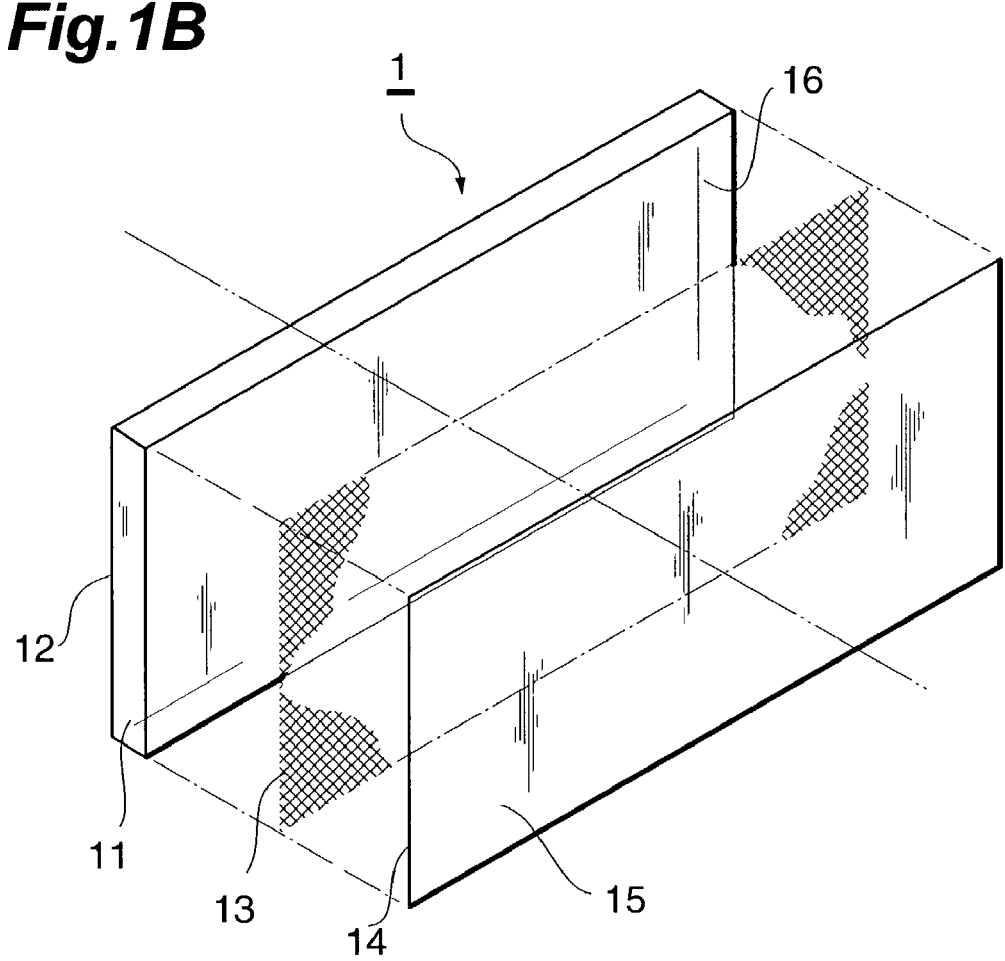
FIG. 1B is an exploded oblique view illustrating the layered structure of the display panel shown in FIG. 1A.

FIG. 1A is a schematic cross section illustrating an example of a display panel in which the optical filter of the present invention is used, and FIG. 1B is an exploded perspective view illustrating the layered structure of the display panel shown in FIG. 1A.

A display panel 1 has the optical filter 16 of the present invention applied to one side of a transparent member 11 that serves as an optically transparent panel attached to the front of a PDP, and a shield mesh 13 (a mesh in which electro-conductive wires are woven vertically and horizontally) is applied and covered with a transparent film 14 made of a resin (such as polyethylene terephthalate (PET)). A reflection reducing film 12 is formed over the entire other side of the transparent member 11. An anti-reflective film 15 is formed on the side of the transparent film 14 not in contact with the shield mesh 13.

The following three types are favorable for the optical filter 16 formed on the transparent member 11.

First Type:

Component A and/or component B is applied by coating or lamination over the transparent member 11, or the above-mentioned liquid composition or adhesive resin composition is applied by coating or lamination, and this is dried to produce a thin film.

Second Type:

A thin sheet or film composed of the above-mentioned resin composition.

Third Type:

Component A and/or component B is applied by coating or lamination to a thin transparent material (sheet, film, etc.), or the above-mentioned liquid composition or adhesive resin composition is applied by coating or lamination, or a film composed of the above-mentioned resin composition is laminated.

The resin used in the above-mentioned resin composition is preferably an acrylic resin, polycarbonate resin, styrene resin, polyester resin, or cellulose resin, and from the standpoints of visible light transmission, weatherproofness, workability, and so on, an acrylic resin is particularly favorable. When a resin composition composed of an acrylic resin is used, the image displayed on the display panel will be bright enough for easy viewing, and the display panel 1 can be obtained with excellent durability and few limitations on the shape into which it is worked.

With a display panel 1 equipped with a transparent member 11 containing an optical filter 16 of each of the above types, the type of component A and/or component B in the optical filter of the present invention, the concentration, and the layer thickness (the thickness of the layer itself in the case of coating or lamination, or the thickness of the resin layer when these components are dispersed in the resin) are adjusted so that the transmissivity of near infrared light of the display panel 1 in a wavelength band of 800 to 1100 nm will be 20% or less, and preferably 15% or less, and even more preferably 10% or less.

Such adjustment will sufficiently attenuate near infrared light with a wavelength of around 950 nm, which is used primarily in infrared communications and so on, so infrared remotes and the like will be less likely to malfunction when used around the display.

If the shield mesh 13 is woven from plastic fibers covered with a transition metal such as copper or nickel, for instance, electromagnetic waves with a frequency ranging from a few megahertz to about 1 GHz can be effectively and reliably blocked. The reflection reducing film 12 and the anti-reflective film 15 can be formed, for example, by alternately laminating a thin film composed of a material with a low refractive index, such as silicon dioxide or aluminum oxide, and a thin film of a material with a high refractive index, such as titanium dioxide or yttrium oxide.

Figure 2:
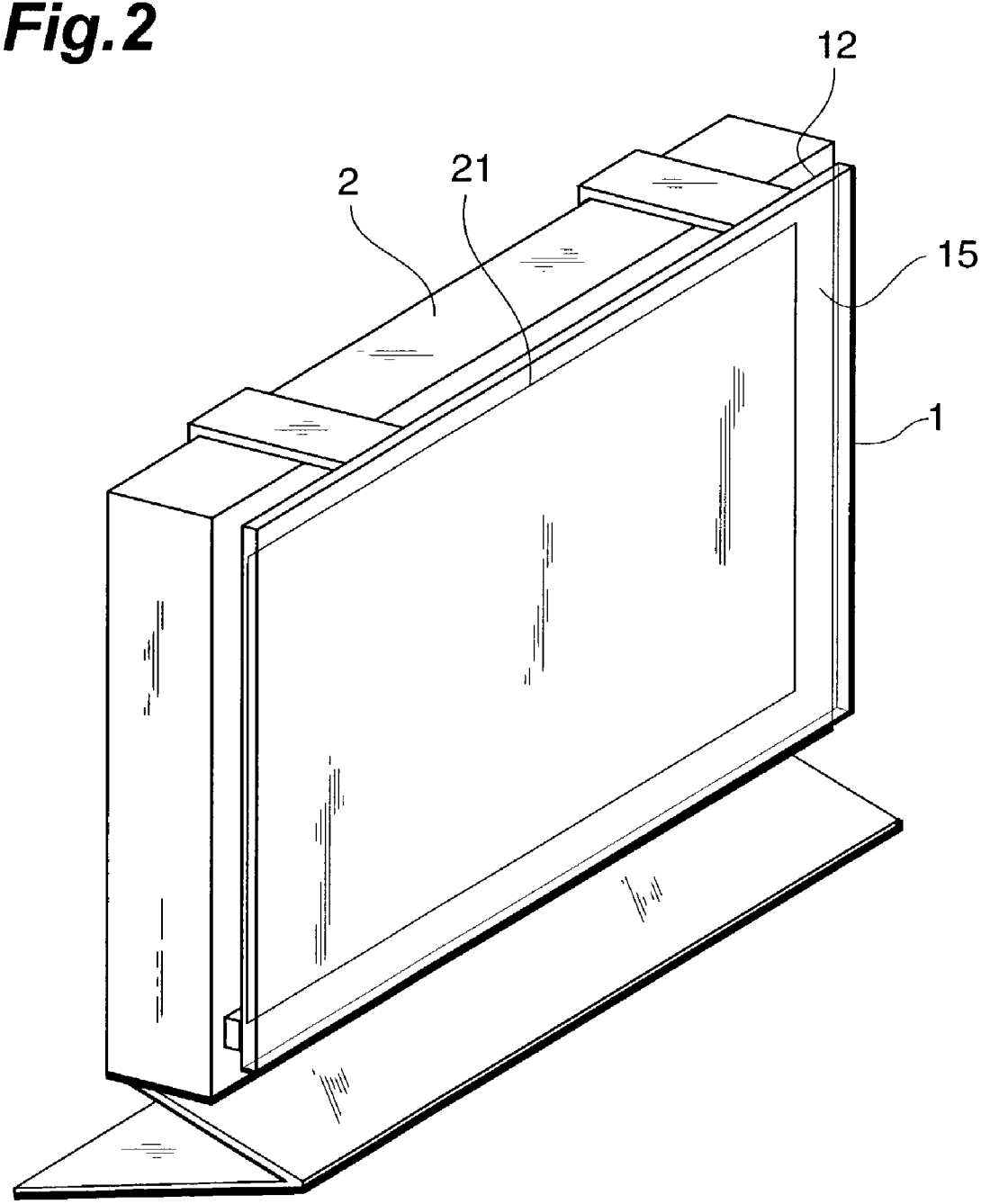
FIG. 2 is a perspective view illustrating an example of how the display panel in FIG. 1 is used.
Figure 3:
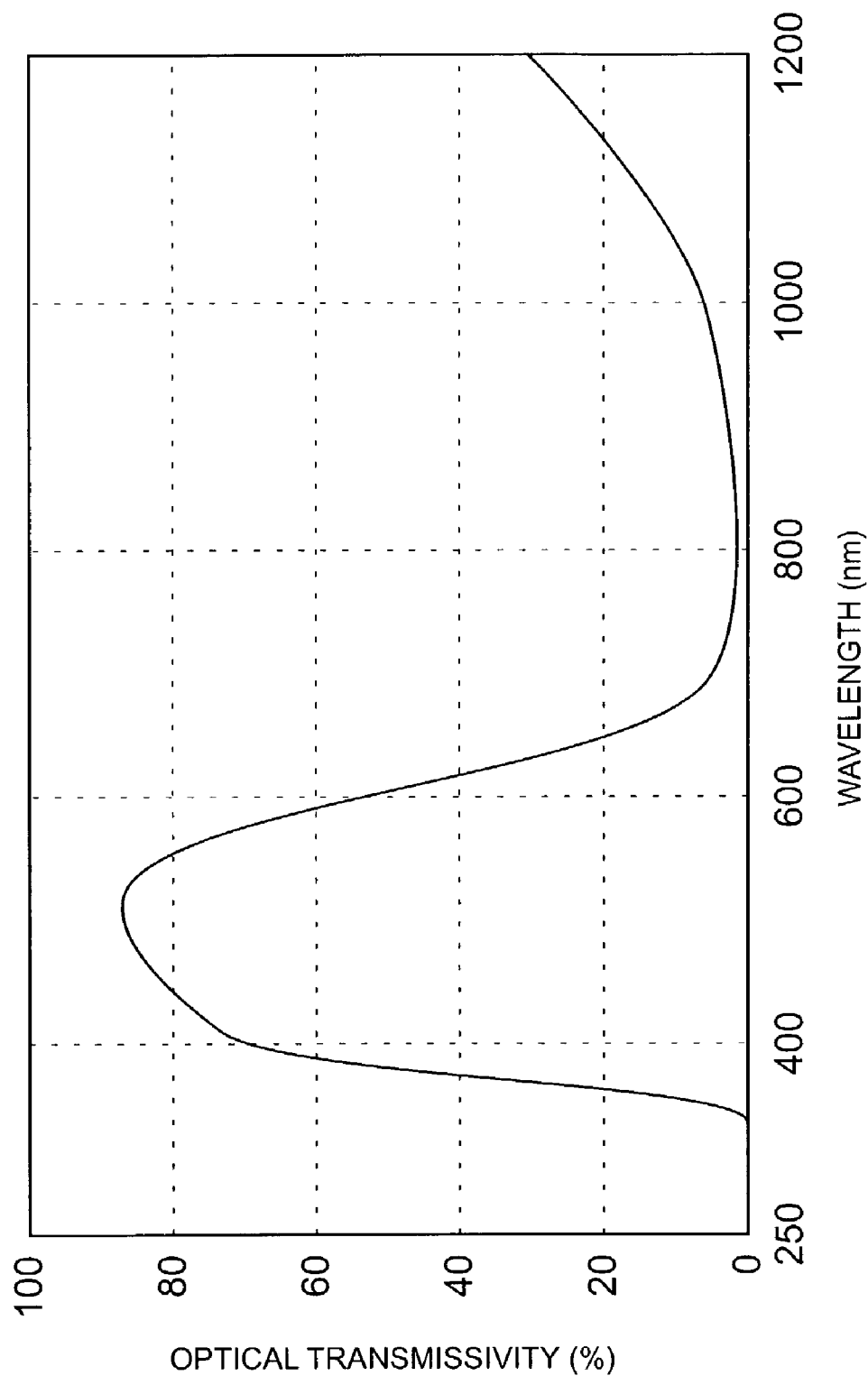
FIG. 3 is a graph of the spectral transmittance spectrum of the optical filter in Example 1.
Figure 4:
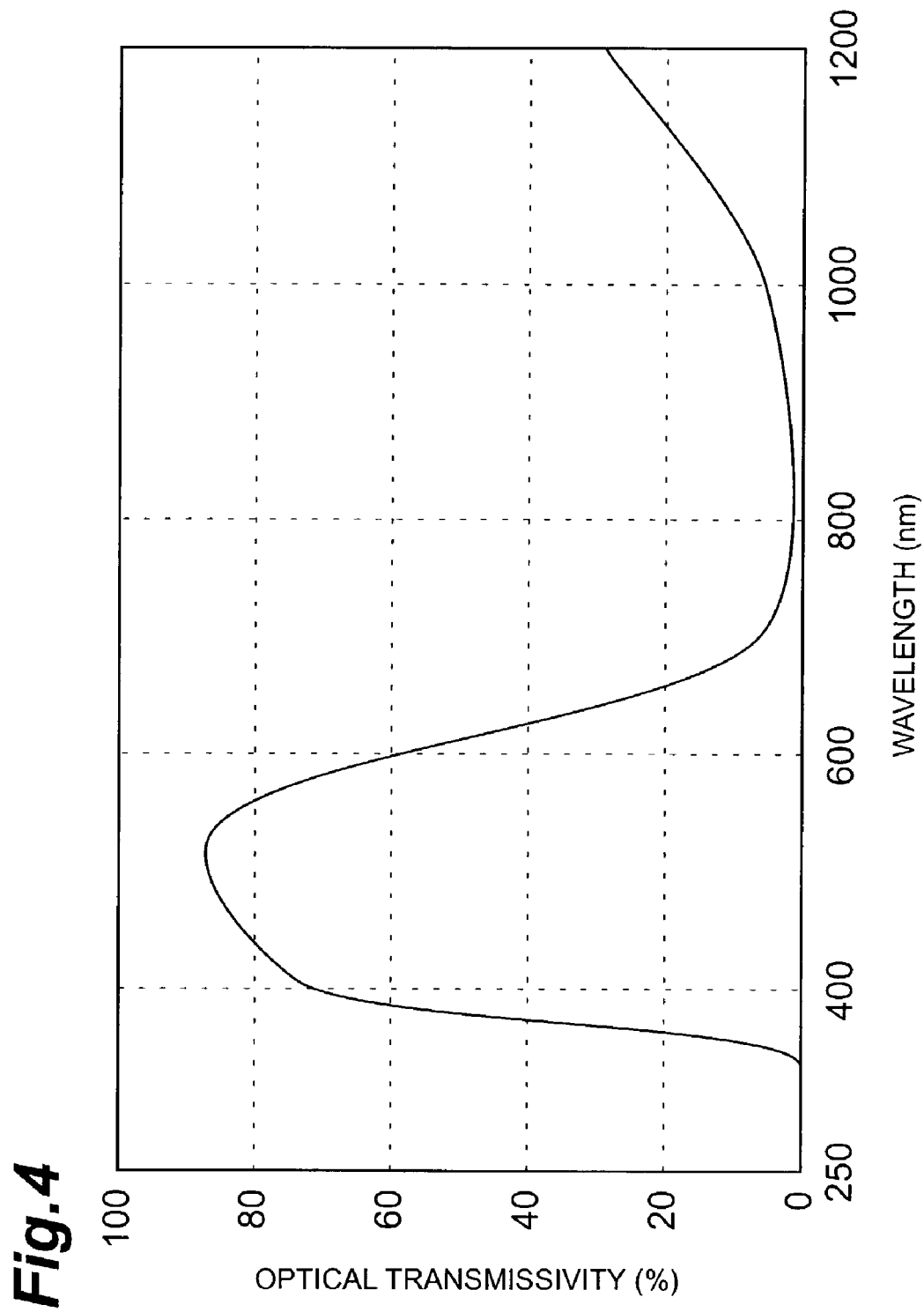
FIG. 4 is a graph of the spectral transmittance spectrum of the optical filter in Example 2.
Figure 5:
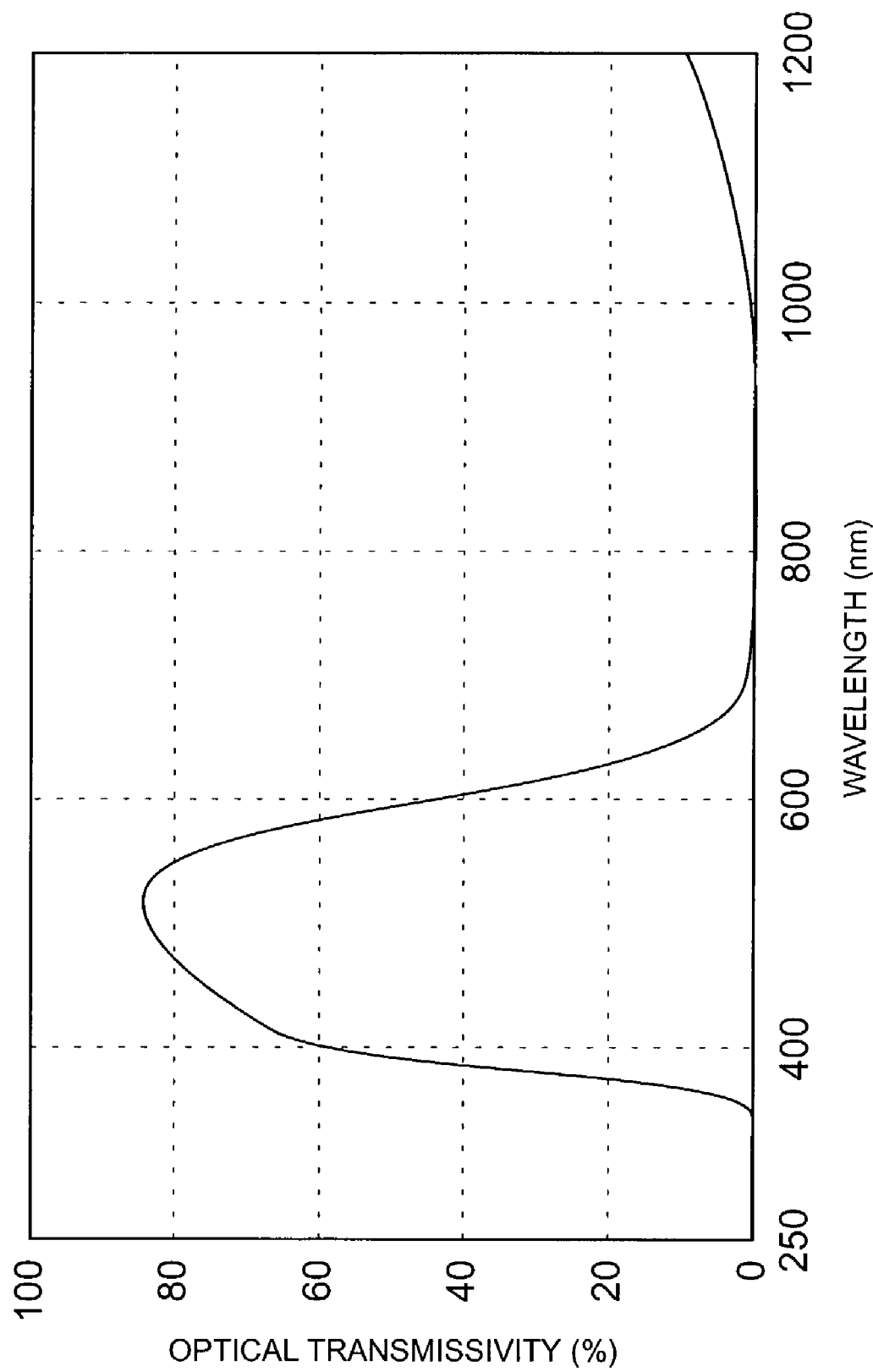
FIG. 5 is a graph of the spectral transmittance spectrum of the optical filter in Comparative Example 1.
Figure 6:
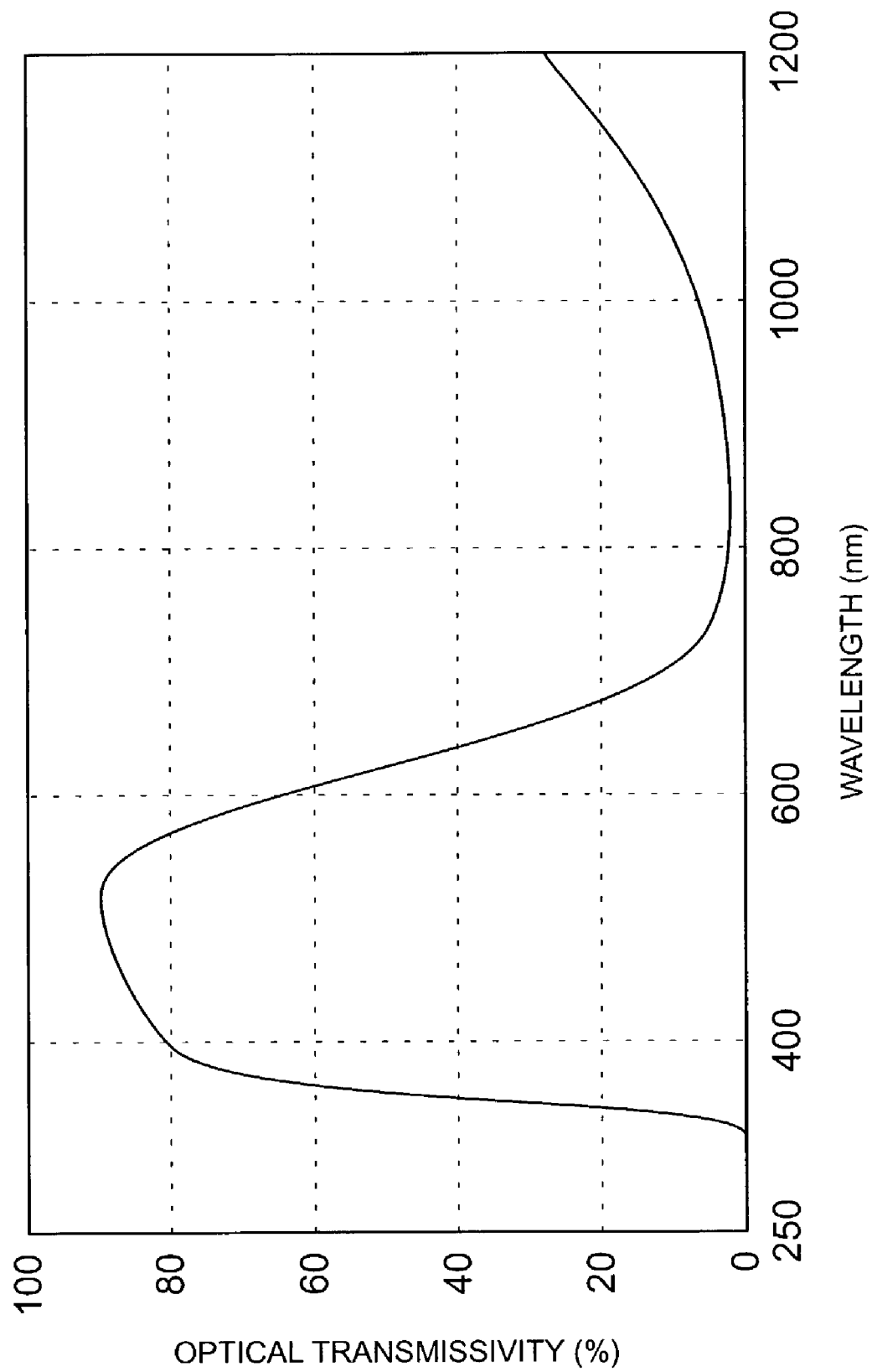
FIG. 6 is a graph of the spectral transmittance spectrum of the optical filter in Comparative Example 2.
Figure 7:
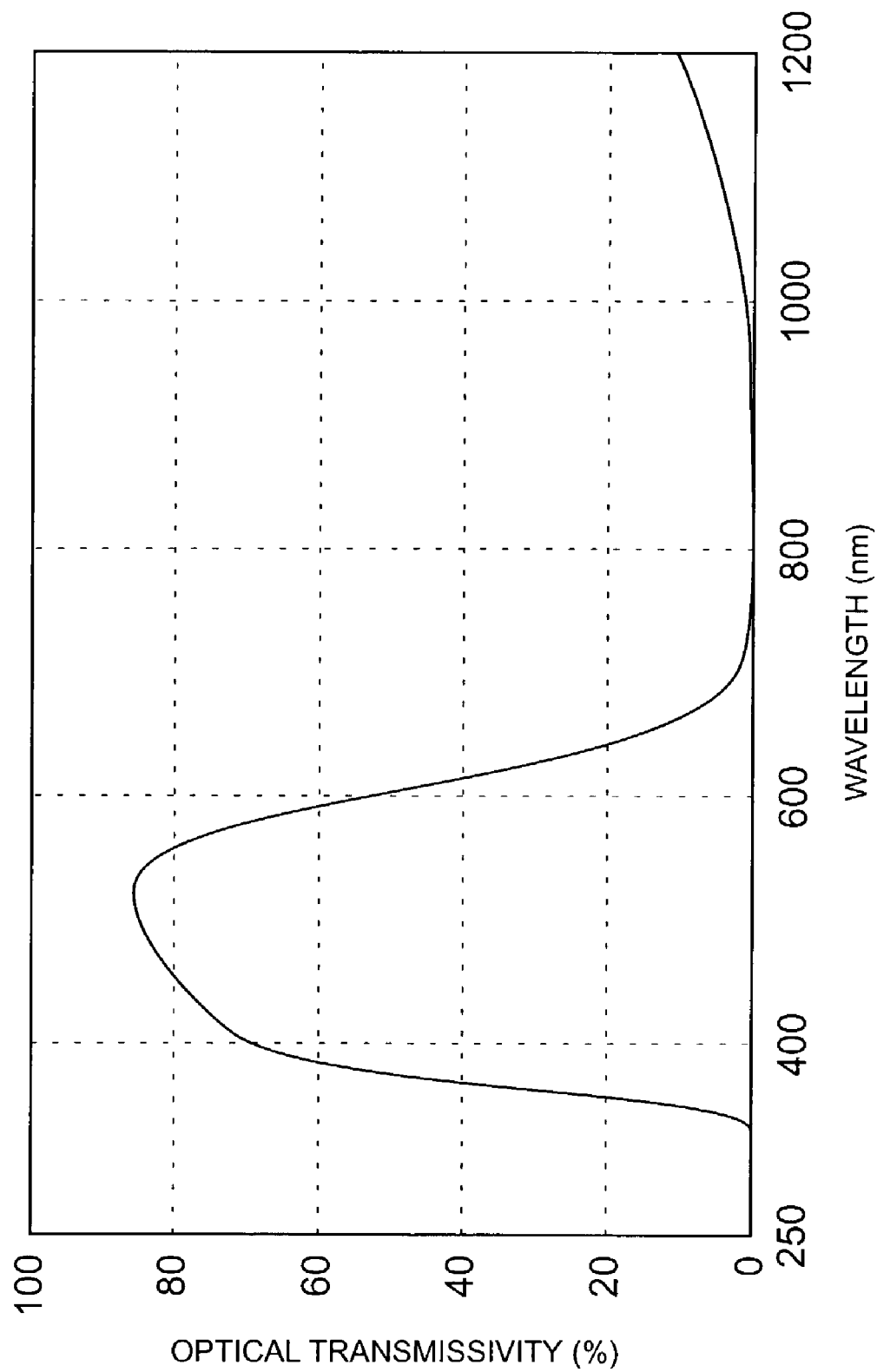
FIG. 7 is a graph of the spectral transmittance spectrum of the optical filter in Comparative Example 3.

FIG. 2 is a perspective view illustrating an example of how the display panel in FIG. 1 is used. As shown in FIG. 2, the display panel 1 is oriented so that the side on which the anti-reflective film 15 is formed is at the front and covers the screen 21 of the PDP 2. Near infrared light emitted from the screen 21 of the PDP 2 is absorbed by the optical filter 16, and its intensity is reduced to 20% or less, and preferably 15% or less, and even more preferably 10% or less.

Meanwhile, almost none of the visible light emitted from the screen 21 of the PDP 2 at the same time as the near infrared light is absorbed by the optical filter 16 provided to the display panel 1. Therefore, even if devices that operate with near infrared light are placed around the PDP 2 shown in FIG. 2, the near infrared light emitted from the screen 21 of the PDP 2 is effectively prevented from causing these devices to malfunction, and the image shown on the screen 21 can be viewed without any problem.

Electromagnetic waves are emitted from the screen 21 of the PDP 2, but since these electromagnetic waves are effectively blocked by the shield mesh 13 shown in FIGS. 1A and 1B, the viewer is not exposed to these electromagnetic waves while viewing the PDP 2.

Furthermore, since this shield mesh 13 is just as electro-conductive as a metal, almost no electrostatic charge builds up on the display panel 1, which prevents dust and so forth from clinging to the display panel 1 due to static electricity. Also, the display panel 1 can be made more lightweight if the shield mesh 13 is made mainly from plastic fibers. Moreover, the shield mesh 13 is very flexible, which is an advantage in that it can be easily applied even if the display panel 1 has a bumpy surface.

When external light (mainly natural light or light from lamps) that is incident on the screen 21 from the display panel 1 side hits the anti-reflective film 15 of the display panel 1, its reflection is prevented by the action of the multiple layers of different refractive indexes that form the anti-reflective film 15.

As a result, even if the PDP is in a brightly lit area, there will be no reflection of external light that would make the image on the screen 21 difficult to view. A tiny portion of the external light here does pass through the anti-reflective film 15, but the reflection of this transmitted light is reduced by the reflection reducing film 12. Thus, reflection of external light that would make it difficult to view the image shown on the screen 21 can be prevented even better.

Near infrared light and infrared light are heat rays, and it is also favorable for the optical filter of the present invention to be laminated or formed on members where heat rays need to be absorbed. A heat ray-absorbent coating, a heat ray-absorbent composite, and a heat ray-absorbent material that makes use of a heat ray-absorbent adhesive will now be described as specific application examples.

Heat Ray-Absorbent Coating

The product of dissolving or dispersing component A and/or component B in a suitable solvent (that is, the above-mentioned liquid composition) is applied to the surface that needs coating, and the solvent is evaporated off to form a thin film over all or part of the surface. This thin film is the optical filter (near infrared light absorption layer) of the present invention, and serves as a heat ray-absorbent coating with excellent near infrared light absorption and moisture resistance. If the thin-film optical filter thus formed is optically transparent, then the liquid composition itself may be transparent, semitransparent, or opaque.

An additive such as a dissolution auxiliary may be added to the liquid composition in order to raise the solubility or dispersibility of component A and/or component B in the solvent, or to increase the flatness and so forth of the side with the heat ray-absorbent coating, that is, the side on which the optical filter is formed. Examples of favorable additives include various surfactants used as anti-foaming agents and leveling agents.

The proportion in which component A and/or component B is contained in the liquid composition used for a heat ray-absorbent coating will vary with the type of liquid solvent being used, and the application or intended use of the heat ray-absorbent coating agent, but from the standpoint of viscosity after preparation, it is usually favorable to adjust the amount to a range of 0.1 to 1900 mass parts, and preferably 1 to 900 mass parts, and even more preferably 5 to 400 mass parts, per 100 mass parts liquid solvent.

Heat Ray-Absorbent Composite

It is useful for the heat ray-absorbent composite to be produced by laminating or forming the optical filter of the present invention on one side of a translucent substrate. Another translucent substrate may also be laminated over this optical filter.

There are no particular restrictions on the material of the substrate as long as it transmits visible light, and the material should be selected as dictated by the application of the heat ray-absorbent composite, but from the standpoints of hardness, heat resistance, chemical resistance, durability, and so forth, it is preferable to use a glass material such as inorganic or organic glass, or a plastic material such as polycarbonate, acrylonitrile-styrene copolymer, polymethyl methacrylate, vinyl chloride resin, polystyrene, or polyester.

The substrate may consist of the same type of materials, or may consist of mutually different materials. Furthermore, it is preferable to perform a hardening treatment on the side on which the optical filter is not laminated or formed because this will prevent scratches and enhance durability on that side. A layer composed of another light transmitting material may be further provided to the substrate. This results in a heat ray-absorbent composite with superior near infrared light absorption and moisture resistance.

A reflection reducing layer or anti-reflective layer may also be provided to at least one face of the optical filter and the substrate of the heat ray absorbent composite. This reflection reducing layer or anti-reflective layer can be formed by using a known material composed of an inorganic oxide, inorganic halide, or the like and any of various known methods such as vacuum vapor deposition, ion plating, and sputtering. If needed, a visible light absorbent that absorbs visible light of a specific wavelength, such as a metal ion-containing component containing cobalt ions that selectively absorb at a wavelength of 500 to 600 nm, or another additive may also be mixed with the resin composition.

Heat Ray-Absorbent Material that Makes Use of a Heat Ray-Absorbent Adhesive

It is useful for the heat ray-absorbent adhesive to contain a self-adhesive resin and component A and/or component B. A self-adhesive acrylic resin can be used favorably as this self-adhesive resin. This is obtained by polymerizing a monomer composition containing a monomer of the acrylic resin that makes up the adhesive component.

An acrylic acid alkyl ester in which the carbon number of the alkyl groups is 4 to 12 and the glass transition point of the homopolymer is from −70 to −30° C. can be used favorably as this acrylic resin monomer, specific examples of which include n-butyl acrylate, 2-ethylhexyl acrylate, octyl acrylate, and decyl acrylate.

The monomer composition used to obtain a self-adhesive acrylic resin preferably contains a monomer that constitutes an agglomeration component and a monomer that constitutes a modification component in addition to the acrylic resin monomer used as the above-mentioned self-adhesive component.

The monomer having the agglomeration component is one that can be copolymerized with the acrylic resin monomer used as the self-adhesive component, and has the action of raising the glass transition point of the copolymer thus obtained. Specific examples include acrylic acid alkyl esters having a $C_1$ to $C_3$ lower alkyl group, methacrylic acid alkyl esters, vinyl acetate, vinylidene chloride, acrylonitrile, and styrene.

The monomer used as the modification component is one that can be copolymerized with the acrylic resin monomer used as the self-adhesive component, and has functional groups. Specific examples include acrylic acid, methacrylic acid, maleic acid, maleic acid monoesters, and other carboxyl-containing compounds; 2-hydroxyethyl acrylate, 2-hydroxyethyl methacrylate, and other hydroxyl-containing compounds; acrylamide, methacrylamide, N-tert-butylacrylamide, N-octylacrylamide, and other acid amide compounds; and glycidyl acrylate, glycidyl methacrylate, and other glycidyl-containing monomers.

The proportions in which the various monomers are used in the above-mentioned monomer composition will vary with the type of monomer being used, the intended use of the obtained acrylic resin composition, and so on, but usually the acrylic resin monomer used as the self-adhesive component accounts for 30 to 95 mass %, the monomer used as the agglomeration component for 5 to 50 mass %, and the monomer used as the modification component for 0.1 to 10 mass %. Solution polymerization or emulsion polymerization can be used as the method for polymerizing this monomer composition.

Examples of catalysts that can be used in this polymerization include benzoyl peroxide, ammonium persulfate, azobisisobutyronitrile, potassium persulfate, and other peroxides. When the polymerization of the monomer resin composition is accomplished by solution polymerization, any of various organic solvents can be used as the polymerization solvent, examples of which include ethyl acetate and other esters, aromatic hydrocarbons, and ketones. When the monomer composition is polymerized by emulsion polymerization, any of various known compounds ordinarily used in emulsion polymerization can be used as an emulsifier.

Polymerizing the monomer composition yields a self-adhesive acrylic resin in the form of a polymer solution or latex. Component A and/or component B is mixed into the polymer solution or latex thus obtained, and this mixture is applied by coating or lamination so as to be thinly stretched over the substrate, for example, thereby forming a self-adhesive optical filter.

If needed, a visible light absorbent that absorbs visible light of a certain wavelength, such as a metal ion-containing component containing cobalt ions that selectively absorb at a wavelength of 500 to 600 nm, or other additives may be mixed into the above mixture.

The proportion in which component A and/or component B is contained in the heat ray-absorbent adhesive should be as large as possible to the extent that the translucence and adhesion of the self-adhesive acrylic resin are not compromised, and it is favorable to adjust the amount to a range of 0.1 to 400 mass parts, and preferably 0.3 to 200 mass parts, and even more preferably 1 to 100 mass parts, per 100 mass parts self-adhesive acrylic resin.

A heat ray-absorbent material on which a self-adhesive optical filter has been formed can be easily obtained by coating a transparent substrate with this heat ray-absorbent adhesive. The above-mentioned heat ray-absorbent composite can be easily obtained by laminating a substrate over this optical filter, without using an adhesive for this lamination.

The heat ray-absorbent coating, heat ray-absorbent composite, and heat ray-absorbent material that makes use of a heat ray-absorbent adhesive described above can be favorably applied to translucent members with which heat rays need to be blocked, for instance. Specific examples include windows for homes and other buildings, windows for automobiles, trains, and other such vehicles, windows for aircraft, ships, and other such vehicles, and other members that provide light and a view.

Compared to when a light blocking member that absorbs visible light is used in order to block out heat rays, these window materials have superior visible light transmission while offering equivalent or better heat ray absorption, so they afford excellent visibility of what is outside the window, and tend to provide a more spacious feel. Also, since the optical filter of the present invention has excellent moisture resistance, when a window or the like having this optical filter is used outdoors or another place where it will be exposed to high temperature and humidity, an advantage is that devitrification will be less apt to occur, and good heat ray absorption can be maintained for an extended period.

Another example of an application is an agricultural covering material used to construct a greenhouse for enclosing a plant cultivation area. The purpose of a greenhouse is to maintain the internal temperature, but there is the danger that in the summertime heat rays from the outside may raise the internal temperature higher than necessary. If an agricultural covering material that has been given the above-mentioned heat ray-absorbent coating, or an agricultural covering material formed from the above-mentioned heat ray-absorbent composite or heat ray-absorbent material is used, excessive elevation of the temperature inside a greenhouse or the like is effectively suppressed, which extends the usable life of the greenhouse and makes it more cost effective. Also, since visible light transmission is excellent, there will also be an improvement in visibility of the interior from outside the greenhouse. Furthermore, because the optical filter of the present invention has excellent moisture resistance, when an agricultural covering material equipped with this optical filter is used outdoors, etc., there will be less devitrification, which is an advantage in that good heat ray absorption can be preserved for an extended period.

EXAMPLES

Specific examples pertaining to the present invention will now be described, but the present invention is not limited to these examples.

Example 1

(1) A monomer solution was obtained by mixing 16 g of the phosphoric ester compound expressed by Formula (28)-s (hereinafter referred to as "phosphoric ester A"), 14.4 g of the phosphoric ester compound expressed by Formula (28)-t (hereinafter referred to as "phosphoric ester B"), 20 g of diethylene glycol dimethacrylate, 48.6 g of methyl methacrylate, and 0.9 g of α-methylstyrene.

(2) 32 g of copper benzoate (cupric benzoate; the same applies hereinafter) was added to and dissolved in this monomer solution, after which this solution was left for 24 hours in a −20° C. refrigerator to crystallize and precipitate the benzoic acid (melting point: 122° C.)

(3) The precipitated benzoic acid was filtered off the monomer solution at an environment temperature of −20° C.

(4) 2.0 g of tert-butyl peroctanoate was added as a polymerization initiator to this monomer solution. This monomer solution was poured into a polymerization cell comprising two glass sheets and a PVC gasket, and heated at successively varying temperatures for 16 hours at 45° C., 8 hours at 60° C., and 3 hours at 100° C., which yielded a light blue, transparent optical filter in the form of a sheet 0.5 mm thick (This entire optical filter was a near infrared light absorption layer).

(5) The phosphorus atom content in this optical filter was 1.13 mol per mole of copper ions (that is, a P/Cu molar ratio of 1.13). The copper ion content in the optical filter was 6.1 wt %.

Example 2

Other than using 17.3 g of phosphoric ester A, 15 g of phosphoric ester B, and 46.7 g of methyl methacrylate, a light blue, transparent optical filter in the form of a sheet 0.5 mm thick was obtained in the same manner as in Example 1 above. The P/Cu molar ratio of this optical filter was 1.20. The copper ion content in the optical filter was 6.1 wt %.

Example 3

Other than adding 0.7 g of water to the monomer solution, a light blue, transparent optical filter in the form of a sheet 0.5 mm thick was obtained in the same manner as in Example 2 above. The P/Cu molar ratio of this optical filter was 1.20. The copper ion content in the optical filter was 6.1 wt %.

Comparative Example 1

Other than using 12 g of phosphoric ester A, 11.7 g of phosphoric ester B, 55.3 g of methyl methacrylate, and 20 g of copper benzoate, a light blue, transparent optical filter in the form of a sheet 0.5 mm thick was obtained in the same manner as in Example 1 above. The P/Cu molar ratio of this optical filter was 1.42. The copper ion content in the optical filter was 3.9 wt %.

Comparative Example 2

Other than using 21.5 g of phosphoric ester A, 23.5 g of phosphoric ester B, and 34 g of methyl methacrylate, a light blue, transparent optical filter in the form of a sheet 0.5 mm thick was obtained in the same manner as in Example 1 above. The P/Cu molar ratio of this optical filter was 1.71. The copper ion content in the optical filter was 6.1 wt %.

Comparative Example 3

Other than using 14.5 g of phosphoric ester A, 14 g of phosphoric ester B, and 50.5 g of methyl methacrylate, a light blue, transparent optical filter in the form of a sheet 0.5 mm thick was obtained in the same manner as in Example 3 above. The P/Cu molar ratio of this optical filter was 1.71.

The copper ion content in the optical filter was 3.9 wt %.

Spectral Transmittance Measurement

Using a spectrophotometer "U-4000" (made by Hitachi) the spectral transmittance at a wavelength of 250 to 1200 nm was measured for the optical filters produced in Examples 1 to 3 and Comparative Examples 1 to 3. FIGS. 3 to 7 show the spectral transmittance spectra for the optical filters of Examples 1 and 2 and Comparative Examples 1 to 3. These results confirmed that the optical filters of the present invention had sufficient visible light transmission and near infrared light absorption. The optical filter in Example 3 had transparency equal to or greater than that of the optical filter in Example 2.

Moisture Resistance Test

The optical filters produced in Examples 1 to 3 and Comparative Examples 1 to 3 were left in an environment with an ambient temperature of 60° C. and a relative humidity of 90%, and the time (hours) was recorded at the point when each optical filter whitened (became turbid) and devitrified (determined visually). The results are given in Table 1 (the components, etc., of the optical filters are also given in Table 1). It was found from these results that there is a tendency for devitrification to be less likely to occur as the P/Cu molar ratio decreases.

Whereas the optical filters of the comparative examples underwent devitrification at 660 hours at the longest, the optical filters of the examples took at least 1100 hours to undergo devitrification. This confirms that the optical filters of the present invention have much better moisture resistance. Furthermore, the optical filter of Example 3, which was produced by further adding water to the composition of Example 2, took longer to reach devitrification than that of Example 2. This confirms the effectiveness of adding water during preparation.

TABLE 1

|  | Ex. 1 | Ex. 2 | Ex. 3 | Comp. Ex. 1 | Comp. Ex. 2 | Comp. Ex. 3 |
|---|---|---|---|---|---|---|
| P/Cu*1 | 1.13 | 1.20 | 1.20 | 1.42 | 1.71 | 1.71 |
| Copper ion content (wt %) | 6.1 | 6.1 | 6.1 | 3.9 | 6.1 | 3.9 |
| Composition |  |  |  |  |  |  |
| phosphoric ester A | 16 | 17.3 | 17.3 | 12 | 21.5 | 14.5 |
| phosphoric ester B | 14.4 | 15 | 15 | 11.7 | 23.5 | 14 |
| diethylene glycol dimethacrylate | 20 | 20 | 20 | 20 | 20 | 20 |
| methyl methacrylate | 48.6 | 46.7 | 46.7 | 55.3 | 34 | 50.5 |
| α-methylstyrene | 0.9 | 0.9 | 0.9 | 0.9 | 0.9 | 0.9 |
| copper benzoate | 32 | 32 | 32 | 20 | 32 | 20 |
| tert-butyl peroxy-octanoate | 2 | 2 | 2 | 2 | 2 | 2 |
| Optical filter |  |  |  |  |  |  |
| Thickness (mm) | 0.5 | 0.5 | 0.5 | 0.5 | 0.5 | 0.5 |
| Whitening time*2 (hours) | 1824 | 1153 | 1526 | 660 | 137 | 166 |

Notes
*1: Given as the molar ratio.
*2: Given as the time until the optical filter whitened and devitrified when a moisture resistance test was conducted in an environment with an ambient temperature of 60° C. and a relative humidity of 90%.

INDUSTRIAL APPLICABILITY

As described above, with the present invention, when adequate near infrared light absorption is obtained by raising the copper ion content when the thickness of a near infrared light absorption layer has been reduced in an optical filter, a specific phosphoric ester compound is used, and the contents of phosphorus atoms and copper ions in the near infrared light absorption layer are set to specific values, namely, the phosphorus atom content is set to between 0.4 and 1.3 mol per mole of copper ions, which makes it possible to obtain an optical filter with extremely good moisture resistance while still having sufficient near infrared light absorption.

The invention claimed is:

1. An optical filter, comprising a near infrared light absorption layer containing the following component A and/or the following component B,
   wherein the phosphorus atom content in the near infrared light absorption layer is 0.4 to 1.3 mol per mole of copper ions,
   and the copper ion content in the near infrared light absorption layer is 2 to 60 wt %:
   Component A: a component composed of copper ions and a phosphoric ester compound expressed by the following Formula (1);
   Component B: a copper phosphate compound obtained by reaction of a copper compound with said phosphoric ester compound,

(1)

(in Formula (1), R is a group expressed by the following Formula (2), (3), (4), (5), (6), (7), (8), or (9), an alkyl group, an aryl group, an aralkyl group, or an alkenyl group, n is 1 or 2, and when n is 1, the R groups may be the same or different),

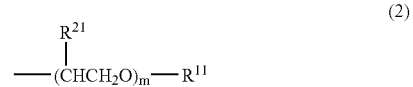
(2)

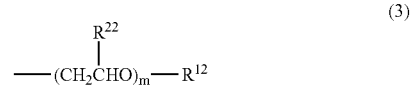
(3)

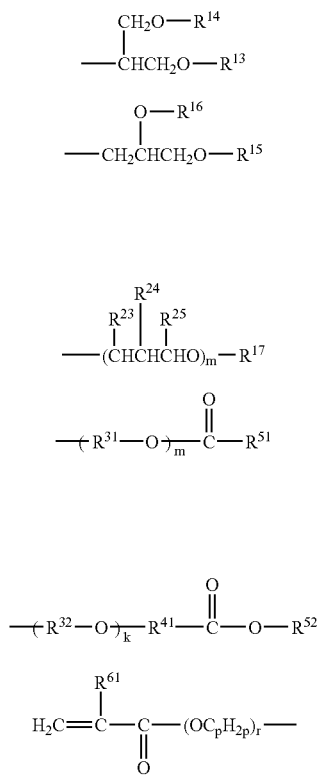

(4)

(5)

(6)

(7)

(8)

(9)

(in Formulas (2) to (9), $R^{11}$ to $R^{17}$ are $C_1$ to $C_{20}$ alkyl groups or $C_6$ to $C_{20}$ aryl groups or aralkyl groups (where the one or more hydrogen atoms bonded to the carbon atoms that make up aromatic rings may be substituted with $C_1$ to $C_6$ alkyl groups or halogens), $R^{21}$ to $R^{25}$ are hydrogen atoms or $C_1$ to $C_4$ alkyl groups (where $R^{23}$, $R^{24}$, and $R^{25}$ cannot all be hydrogen atoms), $R^{31}$ and $R^{32}$ are $C_1$ to $C_6$ alkylene groups, $R^{41}$ is a $C_1$ to $C_{10}$ alkylene group, $R^{51}$ and $R^{52}$ are $C_1$ to $C_{20}$ alkyl groups, $R^{61}$ is a hydrogen atom or methyl group, m is an integer from 1 to 6, k is an integer from 0 to 5, p is an integer from 2 to 97, and r is an integer from 1 to 4).

2. The optical filter according to claim 1, wherein the phosphorus atom content in the near infrared light absorption layer is 0.8 to 1.3 mol per mole of copper ions.

3. The optical filter according to claim 1, wherein the phosphoric ester compound is such that $R^{61}$ in Formula (9) is a methyl group, p in Formula (9) is 2 or 3, and r in Formula (9) is 1.

4. A method for manufacturing an optical filter having a near infrared light absorption layer containing the following component A and/or the following component B:

Component A: a component composed of copper ions and a phosphoric ester compound expressed by the following Formula (1);

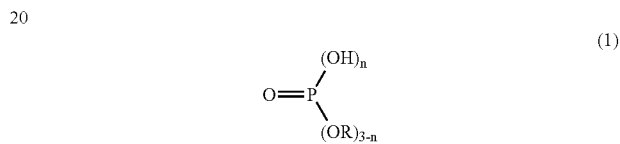

(1)

Component B: a copper phosphate compound obtained by reaction of a copper compound with said phosphoric ester compound, comprising the step of mixing or bringing into contact a phosphoric ester compound expressed by Formula (1), a copper salt, and water.

5. The method for manufacturing an optical filter according to claim 4, said step comprising:

mixing or bringing into contact a phosphoric ester compound expressed by Formula (1), a copper salt, and water such that the phosphorus atom content in the near infrared light absorption layer is 0.4 to 1.3 mol per mole of copper ions, and the copper ion content in the near infrared light absorption layer is 2 to 60 wt %.

* * * * *